(12) United States Patent
Kimura et al.

(10) Patent No.: US 7,751,155 B2
(45) Date of Patent: Jul. 6, 2010

(54) IMAGE PROCESSING METHOD, RECORDER, INK JET RECORDER, PRINTER DRIVER, IMAGE PROCESSOR, IMAGING SYSTEM AND IMAGING METHOD

(75) Inventors: Takashi Kimura, Kanagawa (JP); Masakazu Yoshida, Kanagawa (JP); Masanori Hirano, Kanagawa (JP); Toshihito Kamei, Tokyo (JP); Mikio Ohashi, Kanagawa (JP); Taeko Takahashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1352 days.

(21) Appl. No.: 10/528,716

(22) PCT Filed: Sep. 18, 2003

(86) PCT No.: PCT/JP03/11917

§ 371 (c)(1),
(2), (4) Date: Aug. 22, 2005

(87) PCT Pub. No.: WO2004/026584

PCT Pub. Date: Apr. 1, 2004

(65) Prior Publication Data

US 2006/0092206 A1 May 4, 2006

(30) Foreign Application Priority Data

Sep. 19, 2002 (JP) .............................. 2002-273968
Feb. 25, 2003 (JP) .............................. 2003-046772

(51) Int. Cl.
G11B 5/127 (2006.01)
B41J 29/38 (2006.01)
(52) U.S. Cl. ........................................ 360/319; 347/14
(58) Field of Classification Search ................. 360/319; 347/14; 348/222.1; 358/1.9
See application file for complete search history.

(56) References Cited

U.S. PATENT DOCUMENTS 6,046,822 A 4/2000 Wen et al.
6,494,557 B1* 12/2002 Kato et al. .................... 347/19

(Continued)

FOREIGN PATENT DOCUMENTS

EP 0931663 A2 7/1999

(Continued)

OTHER PUBLICATIONS

Jan. 29, 2008 Japanese official action in connection with corresponding Japanese patent application No. 2006101699517.

*Primary Examiner*—Allen T Cao
(74) *Attorney, Agent, or Firm*—Cooper & Dunham LLP

(57) ABSTRACT

In an ink-jet printing device which has an ink-jet recording head in which a plurality of nozzles are formed, and forms an image based on multi-level image data, a gamma correction parameter is selected according to discharging characteristics of the recording head to an input gradation level or according to lightness characteristics of a printed image to an input gradation level, and an image is formed based on the selected gamma correction parameter. For example, even when there is a variation in lightness characteristics of recording heads as in FIG. 9, an optimal gamma correction parameter is selected for each recording head and the image is formed. Thus, a constant image quality is obtained even if the recording heads are exchanged.

30 Claims, 19 Drawing Sheets

U.S. PATENT DOCUMENTS

| | | | |
|---|---|---|---|
| 6,525,764 B2* | 2/2003 | Kondo et al. | 348/96 |
| 6,710,892 B2* | 3/2004 | Narushima | 358/1.13 |
| 6,993,184 B2* | 1/2006 | Matsugu | 382/173 |
| 2002/0018091 A1 | 2/2002 | Konno et al. | |
| 2002/0054178 A1* | 5/2002 | Sugimoto et al. | 347/15 |
| 2003/0016376 A1* | 1/2003 | Narushima | 358/1.13 |
| 2003/0156196 A1* | 8/2003 | Kato et al. | 348/207.2 |
| 2005/0122410 A1* | 6/2005 | Hattori | 348/231.99 |
| 2006/0174472 A1* | 8/2006 | Zhang et al. | 29/603.03 |

FOREIGN PATENT DOCUMENTS

| | | |
|---|---|---|
| EP | 1080906 A2 | 3/2001 |
| JP | 7-89100 | 4/1995 |
| JP | 7-323551 | 12/1995 |
| JP | 8-118727 | 5/1996 |
| JP | 10-071730 | 3/1998 |
| JP | 11-20204 | 1/1999 |
| JP | 11-105322 | 4/1999 |
| JP | 2000-085158 | 3/2000 |
| JP | 2000-263818 | 9/2000 |
| JP | 1174267 A1 | 1/2001 |
| JP | 2001-292331 | 10/2001 |
| JP | 2002-029042 | 1/2002 |

* cited by examiner

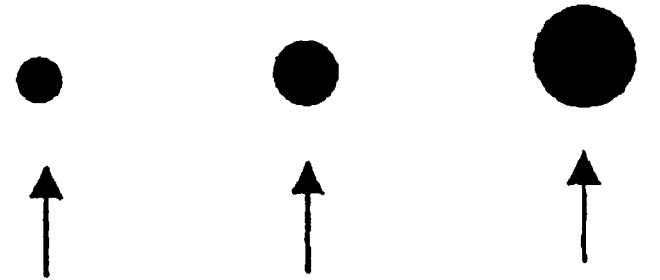
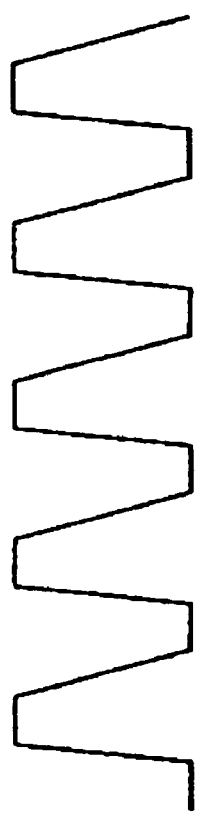
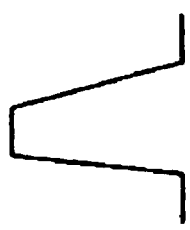
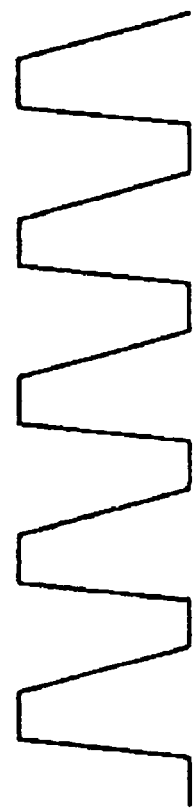
FIG.6A    FIG.6B    FIG.6C    FIG.6D

IMAGE PROCESSING METHOD, RECORDER, INK JET RECORDER, PRINTER DRIVER, IMAGE PROCESSOR, IMAGING SYSTEM AND IMAGING METHOD

TECHNICAL FIELD

The present invention relates to the image-processing method, the printing device, the ink-jet printing device, the printer driver, the image processing apparatus, the image forming system, and the image forming method. More particularly, the present invention relates to the image-processing method which can correct the variation in each recording head without changing the driving conditions of the recording head in which gradation printing is possible as in the ink-jet recording head or the thermal recording head, the printing device, the ink-jet printing device, the printer driver, the image processing apparatus, the image forming system, and the image forming method.

BACKGROUND ART

The printing method in which the printing elements in the recording head in which the plurality of printing elements are provided are driven based on the multi-level image data so that an image is formed on the recording medium is known as the ink-jet printing method, the thermal printing method, etc.

The ink-jet printing method attracts the attention as the office use or others for the reasons that it enables high-speed printing, it can record the image having the gradation levels without requiring any special fixing processing to the plain paper, and the noise occurring at the time of printing is almost negligible.

Conventionally, various ink-jet printing methods have been proposed and the products have been produced and used practically.

In this ink-jet printing method, the ink-jet recording head in which the ink liquid chamber and the nozzle open to the ink liquid chamber are formed is used, and the pressure is applied to the ink in the ink liquid chamber according to image information, so that a small drop of the ink is discharged from the nozzle and made to adhere to the recording medium, such as the paper or the film, and the image is formed on the recording medium.

Moreover, the ink-jet recording head may be classified by the composition into the serial ink jet printer type and the line ink jet printer type.

In the serial ink jet printer, the ink-jet recording head forms the scanning line while scanning the paper in the width direction of the paper (main scanning), the paper is conveyed after one or more scans are completed, and the following scanning line is formed.

On the other hand, in the line serial printer, the nozzles are formed in the width direction of the paper to cover the whole width of the paper, and the printing is performed by conveying the paper without scanning it in the width direction.

The line ink jet printer is advantageous in that it forms one scanning line in the width direction at a time and the printing speed is high. However, there are the problems in that since the recording head itself becomes large, the whole printer must be large in size, and, when the printing with a high resolution is needed, the arrangement of the nozzles must be made to a high density and the manufacture cost of the ink-jet recording head becomes high.

In contrast, the serial ink-jet printer is advantageous in that the image is formed using the comparatively small recording head, and the device cost is low. For this reason, in recent years, many serial ink jet printers have been put in practical use.

The method of applying the pressure to the ink in the ink liquid chamber of the ink-jet recording head may be classified into the method using the piezoelectric element (PZT) which is the electro-mechanical transducer, and the method using the heat produced in the heating resistor like the thermal ink jet printer.

The ink-jet recording head is the integrated device which has the nozzle density in the range of 150-600 dpi and has the number of the nozzles in the order of several 100 nozzles. For this reason, it is difficult to produce all the ink-jet recording heads such that they are completely identical.

Moreover, there is also the variation in the materials used. For example, in the case of the ink-jet printing device using the PZT, the amount of displacement varies according to the material and process tolerance of the PZT. As a result, it is unavoidable that the variation arises in the discharging characteristics of the individual recording heads.

Conventionally, to obviate the above problem, the several methods have been proposed as disclosed in Japanese Laid-Open Patent Application Nos. 2000-085158, 2000-263818, 07-089100, 07-323551, 08-118727, and 11-020204.

The proposed methods of obviating the problem are mainly to change the voltage, the drive time, etc. of the drive waveform and adjust the ink drop speed and weight. However, if the drive waveform is changed, there is the problem that the power consumption in the PZT or the heating resistor may become large. Moreover, changing the drive waveform may make the dot configuration itself change, may make the satellite dot occur, or may make the dust occur, which will cause the image quality to deteriorate.

On the other hand, in the case of the thermal printing method, the recording head (the thermal recording head) in which the number of heating elements are formed is used, and any of the heating elements of the recording head is selected based on the image data and driven to generate heat, so that an image is formed on the thermal paper or the plain copy sheet.

The thermal printing device can record the image with the gradation levels by driving the heating elements of the recording head based on the multi-level image data and adjusting the heating energy, and does not need the post-processing, such as fixing, but has the features that the device size is small, the price is low, the noise at the time of printing is low, the operability is good, and the maintenance is easy to perform.

The recording head used for the thermal printing device may be classified into the line printing type using the recording head in which a large number of heating elements are arranged in a row according to the width of the recording medium and the printing is performed the thermal paper which is conveyed perpendicularly to the heating element row, and the serial printing type using the recording head in which a small number of heating elements are arranged in a row and the head is conveyed in the direction perpendicular to the moving direction of the thermal paper to perform the printing to the thermal paper.

Moreover, as for the thermal recording head, it is difficult to produce all the heating elements such that they are completely identical, and there is also the variation in the heat generating characteristics of the individual recording heads.

DISCLOSURE OF THE INVENTION

A main object of the present invention is to provide an improved printing method and device in which the above-mentioned problems are eliminated.

Another object of the present invention is to provide a printing method and device in which the variation in the recording heads is corrected without changing the driving conditions of the recording heads, such as the ink-jet recording heads or the thermal recording heads.

Another object of the present invention is to provide a printing device which does not have the difference in image quality between the individual recording heads at the time of printing even if there is the difference in the characteristics between the recording head, and which can obtain desirable image quality and does not create the satellite dot, the dust, etc., especially in the case of the ink-jet recording head.

Moreover, when the gamma correction parameter is chosen according to the lightness characteristics of the printed image to the difference in the characteristics of the individual recording heads, the yellow, for example, has little change of lightness for the gradation levels of 0-255, and the maximum change of the yellow is less than ten in the lightness. The variation in the recording heads cannot be detected with sufficient accuracy. Accordingly, another object of the present invention is to provide an image-processing method and a printing device in which the gamma correction parameter is chosen with sufficient accuracy in such a case and the same image quality is obtained for every printer.

In order to achieve the above-mentioned objects, the present invention provide an image-processing method for a printing device which has a recording head in which a plurality of printing elements are provided and drives the printing elements based on multi-level image data to form an image on an recording medium, the image-processing method comprising the steps of: selecting a gamma correction parameter according to printing characteristics of the recording head; and forming an image on the recording medium based on the selected gamma correction parameter.

In order to achieve the above-mentioned objects, the present invention provides a printing device which has a recording head in which a plurality of printing elements are provided and drives the printing elements based on multi-level image data to form an image on an recording medium, the printing device comprising: a selection unit selecting a gamma correction parameter according to printing characteristics of the recording head; and an image forming unit forming an image on the recording medium based on the gamma correction parameter selected by the selection unit.

In order to achieve the above-mentioned objects, the present invention provides an image-processing method for a printing device which has a recording head in which a plurality of printing elements are provided and drives the printing elements based on multi-level image data to form an image on an recording medium, the image-processing method comprising the steps of: selecting a gamma correction parameter according to lightness characteristics of a printed image of the recording head; and forming an image on the recording medium based on the selected gamma correction parameter.

In order to achieve the above-mentioned objects, the present invention provides a printing device which has a recording head in which a plurality of printing elements are provided and drives the printing elements based on multi-level image data to form an image on an recording medium, the printing device comprising: a selection unit selecting a gamma correction parameter according to lightness characteristics of a printed image of the recording head; and an image forming unit forming an image on the recording medium based on the gamma correction parameter selected by the selection unit.

In order to achieve the above-mentioned objects, the present invention provides an image-processing method for a printing device which has a recording head in which a plurality of printing elements are provided and drives the printing elements based on multi-level image data to form an image on an recording medium, the image-processing method comprising the steps of: selecting a gamma correction parameter according to optical density characteristics of a printed image of the recording head; and forming an image on the recording medium based on the selected gamma correction parameter.

In order to achieve the above-mentioned objects, the present invention provides a printing device which has a recording head in which a plurality of printing elements are provided and drives the printing elements based on multi-level image data to form an image on an recording medium, the printing device comprising: a selection unit selecting a gamma correction parameter according to optical density characteristics of a printed image of the recording head; and an image forming unit forming an image on the recording medium based on the gamma correction parameter selected by the selection unit.

In order to achieve the above-mentioned objects, the present invention provides an image-processing method for an ink-jet printing device which has an ink-jet recording head in which a plurality of nozzles are provided and discharges ink drops from the plurality of nozzles based on multi-level image data to form an image on an recording medium, the image-processing method comprising the steps of: selecting a gamma correction parameter according to discharging characteristics of the ink-jet recording head; and forming an image on the recording medium based on the selected gamma correction parameter.

In order to achieve the above-mentioned objects, the present invention provides an ink-jet printing device which has an ink-jet recording head in which a plurality of nozzles are provided and discharges ink drops from the plurality of nozzles based on multi-level image data to form an image on an recording medium, the ink-jet printing device comprising: a selection unit selecting a gamma correction parameter according to discharging characteristics of the ink-jet recording head; and an image forming unit forming an image on the recording medium based on the gamma correction parameter selected by the selection unit.

In order to achieve the above-mentioned objects, the present invention provides an image-processing method for an ink-jet printing device which has an ink-jet recording head in which a plurality of nozzles are provided and discharges ink drops from the plurality of nozzles based on multi-level image data to form an image on an recording medium, comprising the steps of: selecting a gamma correction parameter according to lightness of a printed image of the ink-jet recording head; and forming an image on the recording medium based on the selected gamma correction parameter.

In order to achieve the above-mentioned objects, the present invention provides an ink-jet printing device which has an ink-jet recording head in which a plurality of nozzles are provided and discharges ink drops from the plurality of nozzles based on multi-level image data to form an image on an recording medium, the ink-jet printing device comprising: a selection unit selecting a gamma correction parameter according to lightness of a printed image of the ink-jet recording head; and an image forming unit forming an image on the recording medium based on the gamma correction parameter selected by the selection unit.

In order to achieve the above-mentioned objects, the present invention provides an image-processing method for an ink-jet printing device which has an ink-jet recording head in which a plurality of nozzles are provided and discharges ink drops from the plurality of nozzles based on multi-level image data to form an image on an recording medium, the method comprising the steps of: selecting a gamma correction parameter according to an optical density of a printed image of the ink-jet recording head; and forming an image on the recording medium based on the selected gamma correction parameter.

In order to achieve the above-mentioned objects, the present invention provides an ink-jet printing device which has an ink-jet recording head in which a plurality of nozzles are provided and discharges ink drops from the plurality of nozzles based on multi-level image data to form an image on an recording medium, the ink-jet printing device comprising: a selection unit selecting a gamma correction parameter according to an optical density of a printed image of the ink-jet recording head; and an image forming unit an image on the recording medium based on the gamma correction parameter selected by the selection unit.

In order to achieve the above-mentioned objects, the present invention provides an ink-jet printing device which has a plurality of ink-jet recording heads in which a plurality of nozzles are provided for each ink-jet recording head and discharges ink drops of a plurality of colors from the plurality of nozzles of the plurality of ink-jet recording heads respectively based on multi-level image data to form a color image on an recording medium, each ink-jet recording head comprising: a selection unit selecting a gamma correction parameter of a corresponding color according to discharging characteristics of the ink-jet recording head.

In order to achieve the above-mentioned objects, the present invention provides an ink-jet printing device which has a plurality of ink-jet recording heads in which a plurality of nozzles are provided for each ink-jet recording head and discharges ink drops of a plurality of colors from the plurality of nozzles of the plurality of ink-jet recording heads respectively based on multi-level image data to form a color image on an recording medium, each ink-jet recording head comprising: a selection unit selecting a gamma correction parameter of a corresponding color according to lightness of the corresponding color of a printed image of the ink-jet recording head.

In order to achieve the above-mentioned objects, the present invention provides an ink-jet printing device which has a plurality of ink-jet recording heads in which a plurality of nozzles are provided for each ink-jet recording head and discharges ink drops of a plurality of colors from the plurality of nozzles of the plurality of ink-jet recording heads respectively based on multi-level image data to form a color image on an recording medium, each ink-jet recording head comprising: a selection unit selecting a gamma correction parameter of a corresponding color according to an optical density of the corresponding color of a printed image of the ink-jet recording head.

In order to achieve the above-mentioned objects, the present invention provides an image processing apparatus which communicates with an ink-jet printing device, comprising: a requesting unit requesting a gamma correction parameter or a kind thereof to the ink-jet printing device; a receiving unit receiving the gamma correction parameter or the kind thereof from the ink-jet printing device; and an image processing unit adjusting a gamma correction parameter based on the gamma correction parameter or the kind thereof received by the receiving unit.

In order to achieve the above-mentioned objects, the present invention provides an image forming system including an image processing apparatus and an ink-jet printing device, the image processing apparatus comprising: a requesting unit requesting a gamma correction parameter selection data to the ink-jet printing device; a receiving unit receiving the gamma correction parameter selection data from the ink-jet printing device; and an image processing unit selecting one of a plurality of gamma correction parameters based on the gamma correction parameter selection data received by the receiving unit, and the ink-jet printing device comprising: a storing unit storing the gamma correction parameter selection data; and a transmitting unit transmitting the gamma correction parameter selection data to the image processing apparatus.

In order to achieve the above-mentioned objects, the present invention provides an image forming method of an image forming system including an image processing apparatus and an ink-jet printing device, the image forming method comprising the steps of: requesting a gamma correction parameter selection data to the ink-jet printing device from the image processing apparatus; creating the gamma correction parameter selection data by the ink-jet printing device; transmitting the created the gamma correction parameter selection data to the image processing apparatus; receiving the gamma correction parameter selection data from the ink-jet printing device by the image processing apparatus; and selecting a gamma correction parameter based on the received gamma correction parameter selection data.

According to the present invention, as for the printing device which has the recording head in which the plurality of printing elements are formed, like an ink-jet recording head or a thermal recording head, and drives the printing elements based on the multi-level image data to form an image on the recording medium, even if there is a variation in the characteristics of such recording heads, the variation can be corrected without changing the driving conditions of the recording head concerned simply by selecting the gamma correction parameter according to the characteristics of the recording head concerned.

Moreover, even if there is a variation in the lightness characteristics or the optical density of the printed image between such printing devices, the variation can be corrected without changing the driving conditions of the recording head concerned by selecting the gamma correction parameter through the preparation of the color patch and the color measurement of the color patch, and thus the image formation is performed and a constant image quality is obtained.

Moreover, even if there is a variation in the discharging characteristics when the recording head is the ink-jet recording head, it is possible to correct the variation without changing the driving conditions of the ink-jet recording head by measuring the discharging characteristics of the recording head concerned and selecting the gamma correction parameter. It is possible to obtain a desirable image quality without generating the satellite dot, the dust, etc. in the formed image, and no matter what ink-jet printing device performs the image formation, the same image quality is obtained.

Furthermore, by carrying out the selection of the optimal gamma correction parameter for each of the ink-jet recording heads of the plural colors and performing the image formation, the optical density and the hue of the formed image remain unchanged no matter what ink-jet printing device performs the image formation, and thus a high image quality is obtained.

Other objects, features and advantages of the present invention will be apparent from the following detailed description when reading in conjunction with the accompanying drawings.

BRIEF DESCRIPTION OF THE DRAWINGS

FIG. 2A, FIG. 2B, and FIG. 2C are diagrams showing the recording head unit in the ink-jet printing device, wherein FIG. 2A is a perspective diagram showing the whole recording head unit, FIG. 2B is an enlarged cross-sectional view of the nozzle part, and FIG. 2C is a diagrams showing the arrangement of the plurality of nozzles on the nozzle plate.

FIG. 6A, FIG. 6B, FIG. 6C, and FIG. 6D are diagrams showing the drive waveform of the recording head.

BEST MODE FOR CARRYING OUT THE INVENTION

A description will now be given of the preferred embodiments of the invention with reference to the accompanying drawings.

With reference to FIG. 1 through FIG. 5, the ink-jet printing device in the first preferred embodiment of the present invention will be explained.

Figure 1:
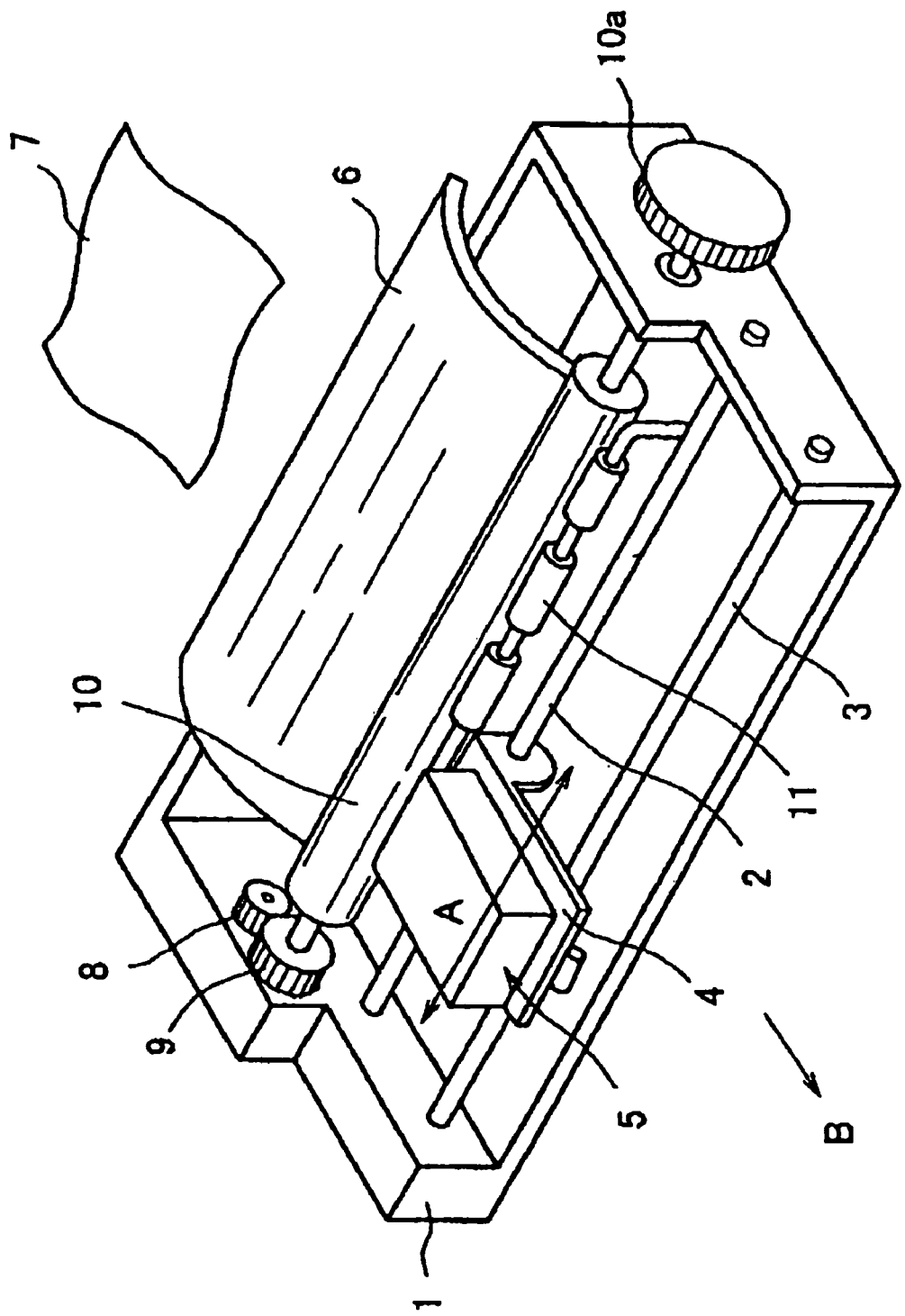
FIG. 1 is a perspective diagram showing the mechanical part of the ink-jet printing device of the embodiment 1 in which the present invention is embodied.
Figure 2A:
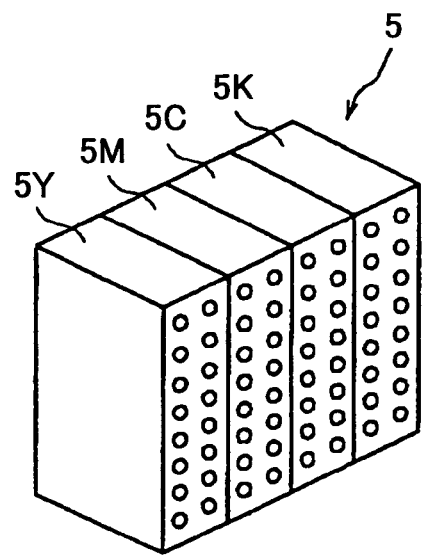
Figure 2B:
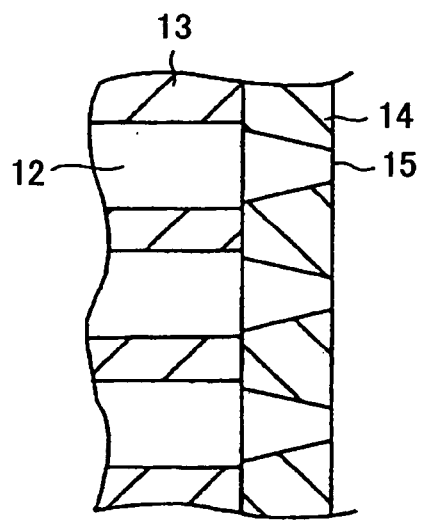
Figure 2C:
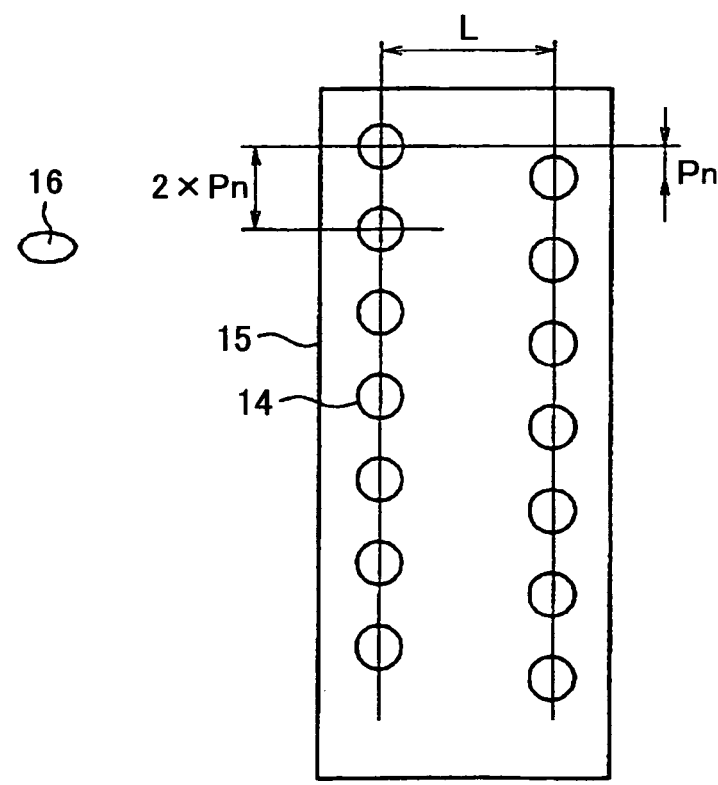
Figure 3:
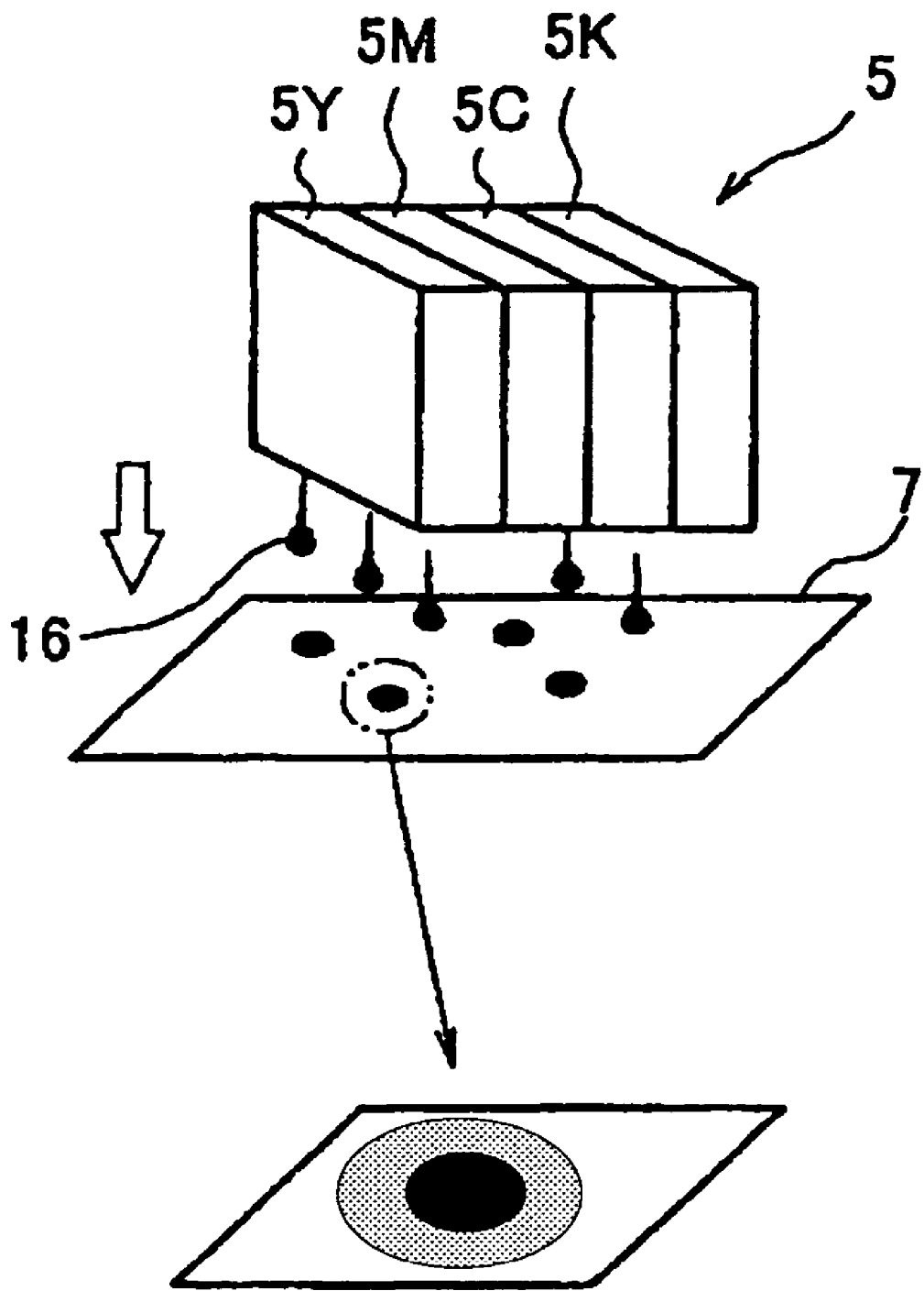
FIG. 3 is a diagram for explaining the way the recording head unit discharges the ink drops to the paper.

FIG. 1 shows the composition of the mechanical part of the ink-jet printing device as the serial printer in which the present invention is embodied. FIG. 2A, FIG. 2B, and FIG. 2C are diagrams showing the recording head unit in the ink-jet printing device, wherein FIG. 2A is a perspective diagram showing the whole recording head unit, FIG. 2B is an enlarged cross-sectional view of the nozzle part, and FIG. 2C is a diagram showing the arrangement of the plurality of nozzles on the nozzle plate. FIG. 3 is a diagram for explaining the way the recording head unit discharges the ink drops to the paper.

The ink-jet printing device of this embodiment comprises the frame 1, the guide rails 2 and 3, the carriage 4, and the printing head 5. The guide rails 2 and 3 are constructed horizontally across the frame 1. The carriage 4 is movably connected to the guide rails 2 and 3 so that the movement of the carriage 4 in the direction indicated by the arrow A in FIG. 1 is possible. The printing head 5 is carried on the carriage 4. The movement of the carriage 4 in the direction of the arrow A is driven by the power source (which is not shown), such as the motor.

The paper (recording paper) 7 which is the printing medium is placed onto the guide board 6, and the paper 7 is received by the platen 10. The platen 10 is equipped with the feeding knob 10a which is rotated through the drive gear 8 and the sprocket gear 9 by the power source which is not illustrated. Conveyance of the paper 7 in the direction indicated by the arrow B in FIG. 1 is allowed by the pressure roller 11 while the paper 7 is compressed between the pressure roller 11 and the peripheral surface of the platen 10 under pressure.

In the ink-jet printing device of this embodiment, the movement or scanning of the printing head 5 (carriage 4) is carried out in the main scanning direction (the direction of the arrow A) while the conveyance of the paper 7 is carried out in the sub-scanning direction (the direction of the arrow B) so that the ink drop is discharged from the printing head 5 and an image is printed on the paper 7.

A description will be given of the carriage 4, the printing head 5, the ink supply system, etc. in the following.

The carriage 4 is equipped with the printing head 5. The printing head 5 comprises the ink-jet heads which carry out the discharging of the ink drop of each of the colors of yellow (Y), cyan (C), magenta (M) and black (Bk) respectively, and the plurality of ink discharge outputs are arranged in the ink-jet heads in the direction which is perpendicular to the main scanning direction, and the head 5 is mounted with the direction of the discharge of the ink drop being the downward direction. In addition, the respective ink cartridges for supplying the ink of each color to the printing head 5 are mounted on the carriage 4 in such a manner that they are exchangeable.

The ink cartridge is provided at the top with the air outlet open to the atmosphere, and provided at the bottom with the ink supply outlet for supplying the ink to the ink-jet head inside. The ink cartridge contains the porosity object inside, and this porosity object being filled with the ink. The ink of the ink cartridge being supplied to the ink-jet head is maintained at a slightly negative pressure by the capillary tube power of the porosity object.

Moreover, the printing head in the present embodiment is constructed using the separate ink-jet heads of the individual color component inks. Alternatively, the printing head may be constructed as one head composition which has the nozzle sequence which carries out the discharge of the ink drop of each color.

Furthermore, in the printing head (ink-jet head) 5, the ink is pressurized and the ink drop is made to form. Although the electrostatic type which is made to carry out displacement of the diaphragm and carries out ink pressurization by the static electricity power between the diaphragm which forms the liquid-chamber surface of a wall by electro-mechanical transducers, such as the piezoelectric element, and forms the piezoelectricity type or the ink passage surface of a wall which carries out ink pressurization through the diaphragm, and the electrode which counters this can be used.

In the present embodiment, a description will be given the case in which the piezoelectric type ink-jet head is used.

As shown in FIG. 2B, the printing head 5 is provided so that the nozzle plate 14 in which the plurality of nozzles 15 are formed is attached to the front surface of the liquid-chamber forming member 13 which forms the liquid chamber 12.

By giving the pressure to the ink in the liquid chamber 12 by the actuator which is the energy occurrence unit by the piezoelectric device which is not illustrated, the ink in the liquid chamber 12 serves as the ink drop 16 from the nozzle 15 of the nozzle plate 14, flies, and adheres to the paper 7 as a dot.

At this time, the desired image is printable by driving selectively the actuator which gives the pressure to each liquid chamber 12.

In this printing head 5, the plurality of nozzles 15 constitute the plurality of dot formation units, and the sequence (nozzle sequence) of the nozzle 15 is made to intersect perpendicularly to the main scanning direction, and the pitch between the nozzles 15-15 is represented by 2×Pn.

Moreover, the nozzles on one recording head are arranged in two sequences with the nozzle sequence distance L. It is shifting, being configured alternately and using the nozzle sequence of the two sequences Pn, and the nozzle sequence of the two sequences can form the image of the pitch Pn in the sub-scanning direction by one scanning and the feed.

Moreover, in order to carry out the movement or scanning of the carriage 4 in the main scanning direction, the drive pulley driven and rotated by the scanning motor and the follower pulley are connected together by the timing belt, and by fixing this timing belt to the carriage, the two-way movement of the carriage is carried out according to the forward or reverse rotation of the scanning motor.

On the other hand, in order to convey the paper set on the guide board to the printing part of the printing head, there are provided the feed roller and friction pad which delivers the paper from the guide board, the guide member which guides the conveyance of the paper, the conveyance roller which conveys the paper from the feed roller, and the tip roller which specifies the delivery angle of the paper from the conveyance roller forced on the peripheral surface of this conveyance roller and the conveyance roller.

The conveyance roller is driven and rotated by the feed roller through the gear train. And the platen roller is configured in order to guide the paper sent out from the conveyance roller corresponding to the successive range of the main scanning direction of the carriage to the printing part of the printing head (guide).

Furthermore, at the downstream part of the printing receptacle in the paper conveyance direction, the conveyance roller which is rotated and driven in order to send out the paper in the ejection direction, and the spur are arranged. Further arranged are the ejection roller for sending out the paper to the ejection tray, the spur, the guide member for securing the ejection course of the paper, etc.

The printing head is made to drive according to the image signal at the time of printing, moving the carriage 4. The ink is breathed out in the stopped paper, the one line is printed, and the following line is printed for the paper after predetermined quantity conveyance.

At the time of the printing end, by receiving the printing end signal or the signal with which the back end of the paper arrived at the printing region, printing operation is terminated and the paper is delivered to the paper.

Moreover, in the position which separated from the printing region by the side of the transfer direction right end of the carriage, the recovery processing device which is not illustrated for recovering the poor discharge of the printing head is configured.

To the recovery processing device, it has the cap unit, the suction unit, and the cleaning unit. During printing standby, it transfers at this recovery processing device side, and capping of the head is carried out with the capping unit, and the carriage can prevent the poor ink discharge by ink dryness by maintaining discharge outlet at the humid state.

Moreover, by carrying out the discharge of the ink which is not related to printing in the middle of printing etc., the ink viscosity in all discharge outputs becomes fixed, and the stable discharge performance is maintained.

When the poor discharge occurs, the discharge outlet of the head is sealed with the capping unit, air bubbles etc. are sucked out of the discharge outlet with the ink with the suction unit through the inner tube, the ink, garbage, etc. adhering to the discharge outlet face are removed by the cleaning unit, and the poor discharge is recovered.

Moreover, the attracted ink is sent to the consumed ink tank (not shown) installed on the main part bottom, and absorbed and retained by the ink absorber inside the consumed ink tank.

Figure 4:
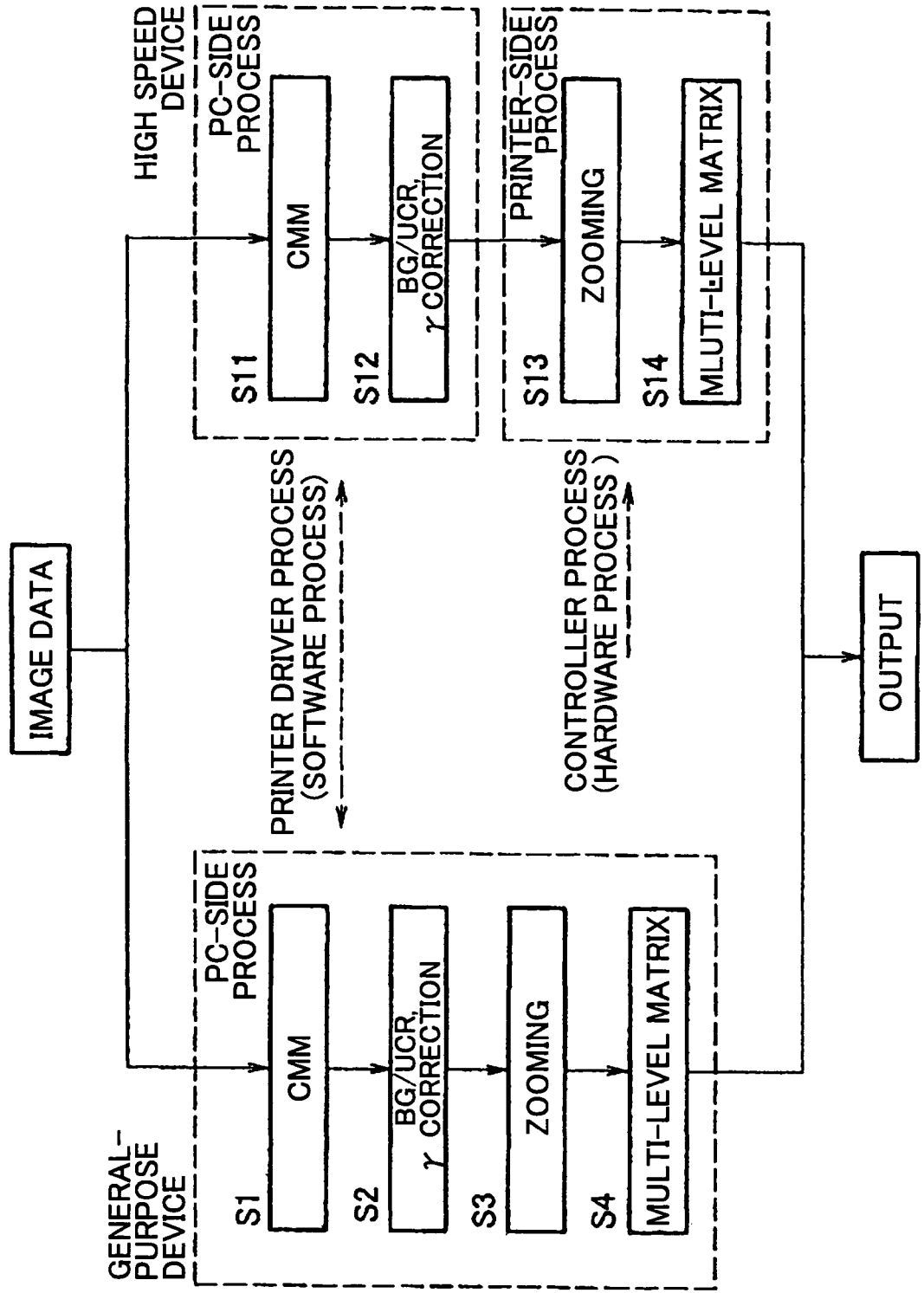
FIG. 4 is a block diagram showing the functional composition of the host computer and the ink-jet printing device.

FIG. 4 shows the functional composition of the host computer and the ink-jet printing device. As shown in FIG. 4, the printing device of the present embodiment is not provided with the function of generating the dot pattern actually printed in response to the print command of the character or image drawing. That is, the print command from the application software executed on the host computer is processed by the print driver incorporated as the software in the host computer, and rasterized to the data of the printing dot pattern, and such data is transmitted to the printing device so that the printing is performed.

Specifically, the print command of the character or image drawing from the application or the operating system in the host computer (for example, the command in which the position, the thickness, the form, etc. of the line to be recorded are described, or the command in which the font, the size, the position of the character to be recorded, etc.) of the character is stored temporarily in the drawing data memory. In addition, these commands are described in the specific print language.

The command stored in the drawing data memory is interpreted by the rasterizer. If it is the command to print a line, it is transformed into the printing dot pattern according to the position, the thickness, etc. of the line which are specified by the command. If it is the command to print a character, the outline information of the corresponding character is called from the font outline data stored in the host computer, and the outline information is transformed into the printing dot pattern according to the size and the position of the character which are specified by the command. Such rasterized dot patterns are stored in the raster data memory.

At this time, the host computer functions to rasterize the command or the outline information into the data of the printing dot pattern by using the known rectangular lattice as the basic printing position. The printing dot pattern stored in the raster data memory is transmitted to the ink-jet printing device via the interface.

Figure 5:
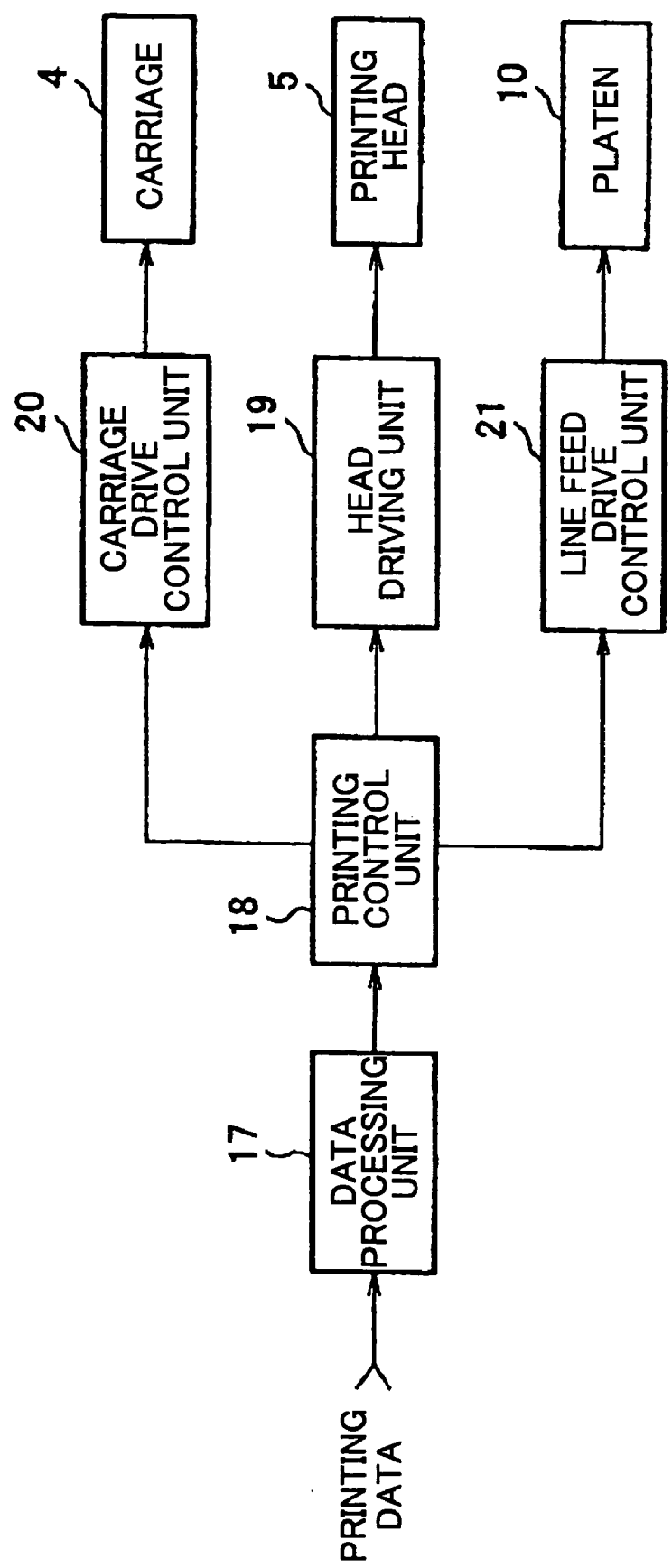
FIG. 5 is a block diagram showing the control unit of the ink-jet printing device of the embodiment 1.

FIG. 5 shows the composition of the control unit of the ink-jet printing device of the embodiment 1.

As shown in FIG. 5, the control unit of the ink-jet printing device comprises the printing control unit 18, the head driving unit 19 which drives each actuator of the printing head 5, the carriage drive control unit 20 which carries out driving control of the carriage 4, the line feed drive control unit 21 which carries out the rotation driving of the platen 10, and the data-processing unit 17.

The printing data sent from the host computer is stored in the raster data memory (which is not illustrated). After the predetermined data is received, the stored printing data is supplied via the data-processing unit 17 to the head driving unit 19 so that the ink drop is discharged from the predetermined nozzle outlet 15 of the printing head 5 based on the printing dot data, the image according to the printing data is printed on the paper 7. At the same time, the rotation of the platen 10 or the conveyance of the paper 7 (the sub-scanning) is controlled through the line feed drive control unit 21 and the movement of the carriage 4 (the main scanning) is controlled through the carriage drive control unit 20.

When the printing on the plain paper is performed by the conventional ink-jet printing device, several image quality problems peculiar to the ink-jet printing arise, such as the color-reproduction characteristic, the durability, the light resistance, the ink dryness characteristic, the character blot (feathering), the color boundary blot (color bleeding), the double-sided printing characteristic, etc. of the image. Furthermore, when the high-speed printing on the plain paper is carried out, it is very difficult to satisfy all these characteristics.

Moreover, the ink commonly used for the ink-jet printing contains the water as the major component, the colorant, and the wetting agents, such as glycerol, for the purpose of prevention of clogging.

As the colorant, there are the dye and the pigment. And the dye based ink is conventionally used in many cases for the color part from the reason that the outstanding coloring characteristic and stability are acquired.

However, if the recording paper only for the ink jet printing in which solidity, such as the light resistance of the image obtained using color system ink and durability, is inferior to the colorant to the thing using the pigment and which has the ink absorption layer especially about durability is used, although it will become possible to aim at a certain amount of improvement, when the plain paper is used, it is common that it is not that which may be satisfactory.

Then, in order to improve the problem over the color system ink in the case where the plain paper is used in recent years, examination or utilization is carried out for use of the pigment system ink which uses the organic pigment, the carbon black, etc. as the colorant to the plain paper printing.

Since the pigment does not have the solubility to the water unlike the color, usually, it mixes and carries out the distributed processing of the pigment with the dispersant, and is used for the water as water ink in the state where stable dispersion is carried out.

Generally, using the pigment allows the light resistance and waterproof improvement to be obtained. However, it is difficult to satisfy the other image quality characteristics simultaneously. Especially, it is difficult to obtain high quality image concentration, sufficient coloring characteristic, color-reproduction characteristic, etc. when carrying out the high-speed printing on the plain paper. There have been still the image quality problems that are not fully satisfactory, such as the character blot, the color boundary blot, the double-sided printing characteristic, the ink dryness characteristic (fixing characteristic), etc.

A description will be given of the composition of the ink according to the present invention. The ink drop according to the present invention employs the printing ink which has the following composition.

That is, the pigment is used as the colorant for printing, and the solvent for decomposing and distributing the pigment is used as the indispensable ingredient. And the wetting agents, the surface active agent, the emulsion, the antiseptics, and the pH adjustment agent are further used as the additives. The wetting agent 1 and the wetting agent 2 are mixed because viscosity adjustment can be performed easily and the respective features of the wetting agents can be harnessed. Namely, the ink according to the present invention is essentially composed of the following elements (1) to (10):

(1) Pigment (self-dispersibility pigment) 6 wt % or more;
(2) Wetting agent 1;
(3) Wetting agent 2;
(4) Water-soluble organic solvent;
(5) Surface active agent of anionic or nonionic type;
(6) Polyol or glycol ether with the carbon number of eight or more;
(7) Emulsion;
(8) Antiseptics;
(9) pH adjustment agent;
(10) Pure water.

Hereafter, each of the elements of the ink according to the present invention will be explained.

(1) Concerning the pigment, the inorganic pigment and the organic pigment may be used without limiting the kind of the pigment. The examples of the inorganic pigment used may include titanium oxide, iron oxide, and further include the carbon black which is manufactured by using the well-known methods, such as the contacting method, the furnace method, and the thermal method.

Moreover, the examples of the organic pigment used may include the azo pigments (for example, azo lake, insoluble azo pigment, condensation azo pigment, chelate azo pigment, etc.), the multi-ring type pigments (for example, phthalocyanine pigment, perylene pigment, perynone pigment, anthraquinone pigment, quinacridone pigment, dioxazine pigment, thioindigo pigment, iso-indolinone pigment, quinophtharone pigment, etc.), the dye chelates (for example, the basic dye type chelate, the acid dye type chelate, etc.), the nitro pigments, the nitroso pigments, the aniline black, etc.

According to the preferred embodiment of the invention, any of these pigments which have a desirable affinity with the water is preferably used. The grain size of the pigment used is desirably in the range of 0.05 to 10 micrometers, and more preferably, 1 micrometer or less, and most preferably, 0.16 micrometers or less.

The amount of addition of the pigment as the colorant in the ink is desirably in the range of about 6 to 20% by weight, and more preferably in the range of about 8 to 12% by weight.

The following are mentioned as the examples of the pigment preferably used according to the present invention.

The examples of the black pigment used may include the carbon black (C. I. pigment black 7), such as the furnace black, the lamp black, the acetylene black, and the channel black, the metals, such as copper, iron (C. I. pigment black 11), and titanium oxide, and the organic pigments, such as the aniline black (C. I. pigment black 1).

Moreover, the examples of the color pigments may include the C.I. pigment yellow 1 (First yellow G), 3, 12 (Diarylide yellow YT 553D), 13, 14, 17, 24, 34, 35, 37, 42 (yellow iron oxide), 53, 55, 81, 83 (Permanent yellow HR), 95, 97, 98, 100, 101, 104, 408, 109, 110, 117, 120, 138, 153, the C.I. pigment oranges 5, 13, 16, 17, 36, 43, 51, the C.I. pigment red 1, 2, 3, 5, 17, 22 (Brilliant first Scarlett), 23, 31, 38, 48:2 (Permanent red 2B (Ba)), 48:2 (Permanent red 2B (calcium)) 48:3 (Permanent red 2B (Sr)), 48:4 (permanent red 2B (Mn)), 49:1, 52:2, 53:1, 57:1 (Brilliant Carmine 6B), 60:1, 63:1, 63:2, 64:1, 81 (Rhodamine 6G lake), 83, 88, 101 (Iron oxide red), 104, 105, 106, 108 (Cadmium red), 112, 114, 122 (quinacridone magenta), 123, 146, 149, 166, 168, 170, 172, 177, 178, 179, 185, 190, 193, 209, 219, the C.I. pigment violet 1 (Rhodamine lake), 3, 5:1, 16, 19, 23, 38, the C.I. pigment blue 1, 2, 15 (Phthalocyanine blue R), 15:1, 15:2, 15:3 (Phthalocyanine blue E), 16, 17:1, 56, 60, 63, the C.I. pigment greens 1, 4, 7, 8, 10, 17, 18, 36, etc.

In addition, the surface of the pigment (for example, carbon) is processed by the resin etc., and the graft pigment which is dispersible in water, the processed pigment which is dispersible in water with the functional groups, such as sulfone group or carboxyl group, which are added to the surface of the pigment (for example, carbon) may be used.

Moreover, the microcapsule which is made to contain the pigment such that the pigment can be dispersed in water may be used.

According to the preferred embodiment of the invention, it is desirable that the pigment for black ink and the dispersant are added to the ink as the pigment dispersion liquid which is made to disperse the pigment in the water medium. The desirable example of the dispersant used may be the known dispersion liquid used for adjusting the known pigment dispersion liquid.

The examples of the dispersion liquid used may include the following: poly-acrylic acid, poly-methacrylic acid, acrylic acid-acrylonitrile copolymer, vinyl acetate acrylic acid ester copolymer, acrylic acid-acrylic acid alkyl ester copolymer, styrene acrylic acid copolymer, styrene methacrylic acid copolymer, styrene acrylic acid-acrylic acid alkyl ester copolymer, styrene methacrylic acid-acrylic acid alkyl ester copolymer, styrene-alpha-methyl styrene acrylic acid copolymer, styrene alpha-methyl styrene acrylic acid copolymer-acrylic acid alkyl ester copolymer, styrene maleic acid copolymer, the vinyl-polymers naphthalene maleic acid copolymer, vinyl acetate ethylene copolymer, vinyl acetate fatty acid vinyl-polymers ethylene copolymer, vinyl acetate maleate copolymer, vinyl acetate crotonic acid copolymer, vinyl acetate acrylic acid copolymer, etc.

According to the preferred embodiment of the invention, the average molecular weight of any of these copolymers used is desirably in the range of 3,000 to 50,000, more preferably, in the range of 5,000 to 30,000, and most preferably in the range of 7,000 to 15,000. The amount of addition of the dispersant used may be in such a range that the pigment is dispersed stably without affecting the effects of the invention. The ratio of the pigment to the dispersant is desirably in the range of 1:0.06 to 1:3 is desirable, and more preferably in the range of 1:0.125 to 1:3.

The ratio of the pigment used for the colorant to the total weight of the printing ink is in the range of 6% to 20% by weight, and the grain size of the colorant pigment is in the range of 0.05 micrometers to 0.16 micrometers. The pigment is dispersed in water, and the dispersant is the macromolecule dispersant the molecular weight of which is in the range of 5,000 to 100,000. If the water-soluble organic solvent containing the pyrolidone derivative, especially 2-pyrolidone is used for at least one of the color inks, the image quality will improve.

(2) to (4) Concerning the wetting agent 1, the wetting agent 2 and the water-soluble organic solvent, the water is used as a liquid medium in the ink. In order to obtain the desired physical properties of the ink and to prevent dryness of the ink, and in order to improve the dissolution stability etc., the examples of the water-soluble organic solvent used may include the following. It is possible to use these water-soluble organic solvents by mixing the plurality of solvents.

The examples of the wetting agents 1 and 2 and the water-soluble organic solvent used may include the following: the polyhydric alcohols, such as ethylene glycol, di-ethylene glycol, tri-ethylene glycol, propylene glycol, di-propyrene glycol, tri-propyrene glycol, tetra-ethylene glycol, hexylene glycol, polyethylene glycol, polypropylene glycol, 1,5-pentanediol, 1,6-hexanediol, glycerol, 1,2,6-hexanetriol, 1,2,4-butanetriol, 1,2,3-butanetriol, petriol; the polyhydric alcohol alkyl esters, such as ethylene glycol mono-ethyl ether, ethylene glycol mono-butyl ether, di-ethylene glycol mono-methyl ether, di-ethylene glycol mono-ethyl ether, di-ethylene glycol mono-butyl ether, tetra-ethylene glycol mono-methyl ether, propylene glycol mono-ethyl ether; the polyhydric alcohol allyl ethers, such as ethylene glycol mono-phenyl ether, ethylene glycol mono-benzyl ether; the nitrogen-including multi-ring compounds, such as 2-pyrolidone, N-methyl-2-pyrolidone, N-hydroxyethyl-2-pyrolidone, 1,3-dimethylimidazolidinone, epsilon-caprolactam, gamma-butyrolactone; the amide compounds, such as formamide, N-methyl formamide, N,N-dimethyl formamide; the amine compounds, such as mono-ethanol amine, di-ethanol amine, tri-ethanol amine, mono-ethyl amine, di-methyl amine, tri-ethyl amine; the sulfur-including compounds, such as di-methyl sulfoxide, sulfolane, thiodiethanol; propylene carbonate, carbonic acid ethylene, etc.

The desirable examples of these organic solvents may include diethylene glycol, thiodiethanol, polyethylene glycol 200-600, triethylene glycol, glycerol, 1,2,6-hexanetriol, 1,2,4-buthanetriol, petriol, 1,5-penthanediol, 2-pyrolidone, and N-methyl-2-pyrolidone. These are effective in solubility and prevention of the poor discharging characteristic due to the moisture evaporation.

The other wetting agents suitably used may contain the saccharide. The examples of the saccharide used may include the monosaccharides, the disaccharide, the oligosaccharides (the trisaccharide and quatrosaccharide are included), and the polysaccharides. The desirable examples of the polysaccharides may include the glucose, the mannose, the fructose, the ribose, the xylose, the arabinose, the galactose, the maltose, the cellobiose, the lactose, the sucrose, the trehalose, the maltotriose, etc. Here, the polysaccharide means the sugar in the wide sense and suppose that it includes the substances which widely exist in the nature, such as alpha-cyclodextrin, cellulose, etc.

Moreover, the examples of the derivatives of these saccharides may include the reducing sugar (for example, the sugar alcohol (general formula: $HOCH_2(CHOH)_nCH_2OH$ where n is the integer of 2 to 5), the oxidation sugar (for example, the aldon acid, the uron acid, etc.), the amino acid, the thio acid, etc. Especially the sugar alcohol is desirable and the desirable examples of the sugar alcohol may include the Maltitol, the Sorbit, etc.

The content of the saccharides in the ink is desirably in the range of 0.1 to 40% by weight, and more preferably in the range of 0.5-30% by weight.

(5) Concerning the anionic or nonionic surface active agent, any agent may be used without limiting the kind of the surface active agent. The examples of the anionic surface active agent used may include polyoxyethylene alkyl ether acetate, dodecylbenzene sulfonate, lauric acid salt, polyoxyethylene alkyl ether sulfate, etc.

The examples of the nonionic surface active agent may include polyoxyethylene alkyl ether, polyoxyethylene alkyl ester, polyoxyethylene sorbitan fatty acid ester, polyoxyethylene alkylphenyl ether, polyoxyethylene alkyl amine, polyoxyethylene alkyl amide, etc. One of the above examples of the surface active agents may be used solely or the plurality of among them may be mixed in combination.

The surface tension according to the present invention is an index which denotes the permeability to paper. Specifically, it means the dynamic surface tension for the short time within one second after the surface is formed, and it differs from the static surface tension measured by the saturation time.

Although any method of measuring the dynamic surface tension, such as the conventional measuring method which is known from Japanese Laid-Open patent Application No. 63-31237, can be used, the surface tension measuring instrument of Wilhelmy hung-board type is used to measure the dynamic surface tension according to the present invention.

The desirable value of the surface tension which allows excellent fixing characteristic and dryness characteristic is smaller than 40 mJ/m$^2$, and more preferably it is smaller than 35 mJ/m$^2$.

(6) Concerning the polyol or glycol ether with the carbon number of eight or more, the polyol and/or glycol ether which is partially water-soluble and has the solubility in a range of 0.1 to 4.5% by weight in water at 25-degree C. is added so that the ratio of the content of the polyol and/or glycol ether to the total weight of the printing ink is in the range of 0.1 to 10.0% by weight. It is turned out that if the above conditions are met, the wettability to the heat element of the ink is improved and the discharge stability and frequency stability are acquired with a small amount of addition.

(6-1) 2-ethyl-1,3-hexanediol; solubility: 4.2% (20 degrees C.)

(6-2) 2,2,4-trimethyl-1,3-pentanediol; solubility: 2.0% (25 degrees C.)

The penetrant which has the solubility in the range of 0.1 to 4.5% by weight in water at 25-degree C. is advantageous in that the permeability is high in spite of low solubility. Therefore, it is possible to produce the ink which has high permeability, with the other solvent in combination with the penetrant having the solubility in the range of 0.1-4.5% by weight in water at 25-degree C., or in combination with the other surface active agent.

(7) Concerning the emulsion, it is desirable that the resin emulsion be added to the ink according to the present invention. The resin emulsion means the emulsion whose continuation phase is the water and whose dispersion phase is one of the following resin ingredients. The examples of the resin ingredients of the dispersion phase of the resin emulsion used may include the acrylic resin, the vinyl acetate resin, the styrene-butadiene resin, the vinyl chloride resin, the acrylic styrene resin, the butadiene resin, the styrene resin, etc.

According to the preferred embodiment of the invention, it is desirable that the resin is the polymer having both the hydrophilic portion and the hydrophobic portion.

Moreover, although the grain size of the resin is not limited as long as the emulsion is formed, the desirable diameter of the grain of the resin is about 150 nm or less, and more preferably is in the range of 5 to 100 nm. In these resin emulsions, the resin particles can be obtained by mixing in the water with the surface active agent in some case.

For example, the emulsion of the acrylic resin or the styrene-acrylic resin can be obtained by mixing (meta) acrylic acid ester and the surface active agent with (meta) acrylic acid ester or styrene, and in some case (meta) acrylic acid (meta) ester in the water.

The rate of mixture with the resin ingredients and the surface active agent is desirably in the range of 10:1 to 5:1.

The formation of the emulsion becomes difficult when the amount of the surface active agent used does not reach the range. On the other hand, when the amount of the surface active agent used exceeds the range, the durability of the ink falls or there is the tendency for permeability to get worse.

The rate of the weight parts of the water to 100 weight parts of the resin in the dispersion phase of the resin emulsion is desirably in the range of 60 to 400, and more preferably in the range of 100 to 200. The examples of the commercially available resin emulsions may include "maikuro-jeru" E-1002 and E-5002 (styrene acrylic resin emulsion, Nippon Paint Co., Ltd.), "bonkohto" 4001 (acrylic resin emulsion, Dainippon Ink & Chemicals Inc.), "bonkohto" 5454 (styrene acrylic resin emulsion, Dainippon Ink & Chemicals Inc.), SAE-1014 (styrene acrylic resin emulsion, Nippon Zeon Co., Ltd.), "saibinohru" SK-200 (acrylic resin emulsion, Saiden Chemistry Co., Ltd.), etc.

In the ink used according to the present invention, the ratio of the content of the resin ingredients of the resin emulsion to the ink is desirably in the range of 0.1-40% by weight, and more preferably in the range of 1-25% by weight.

The resin emulsion has the character thickened and condensed, inhibits the osmosis of the coloring ingredients, and further has the effect which promotes fixing to the printing medium.

Moreover, depending on the kind of resin emulsion, the coat is formed on record material, and it has the effect which also raises the friction resistance of the printed matter.

(8) to (10) The known additives in the art, other than the colorant, the solvent, and the surface active agent, can be added to the ink according to the present invention.

The examples of the antiseptics or antimold used may include dehydroacetic acid sodium, sorbic acid sodium, 2-pyridinethiol-1-oxide sodium, benzoic acid sodium, pentachlorophenol sodium, etc.

Concerning the pH adjustment agent, any arbitrary substances can be used if the pH value of the ink can be adjusted to be seven or more without affecting the ink prepared. The examples of the pH adjustment agent used may include the amines, such as diethanol amine and triethanol amine, the carbonates of alkali metals, such as lithium carbonate, sodium carbonate and potassium carbonate, the hydroxides of alkali metals, lithium hydroxide, sodium hydroxide, potassium hydroxide, ammonium hydroxide, the 4th class ammonium hydroxide, the 4th class phosphonium hydroxide, etc.

The examples of the chelating reagent used may includes ethylene-diamine-tetraacetic acid sodium, nitrilo-triacetic acid sodium, hydroxyethyl ethylenediamine-triacetic acid sodium, diethylene-triamine-pentaacetic acid sodium, uramildiacetic acid sodium, etc.

The examples of the anticorrosive used may include acid sulfite, sodium thiosulfate, ammonium thiodiglycolate, diisopropylamine nitrite, pentaerythritol tetranitrate, dicyclohexylamine nitrite, etc.

Next, the method of correcting the variation between the recording heads of the discharging characteristics of the present invention will be explained.

Figure 7:
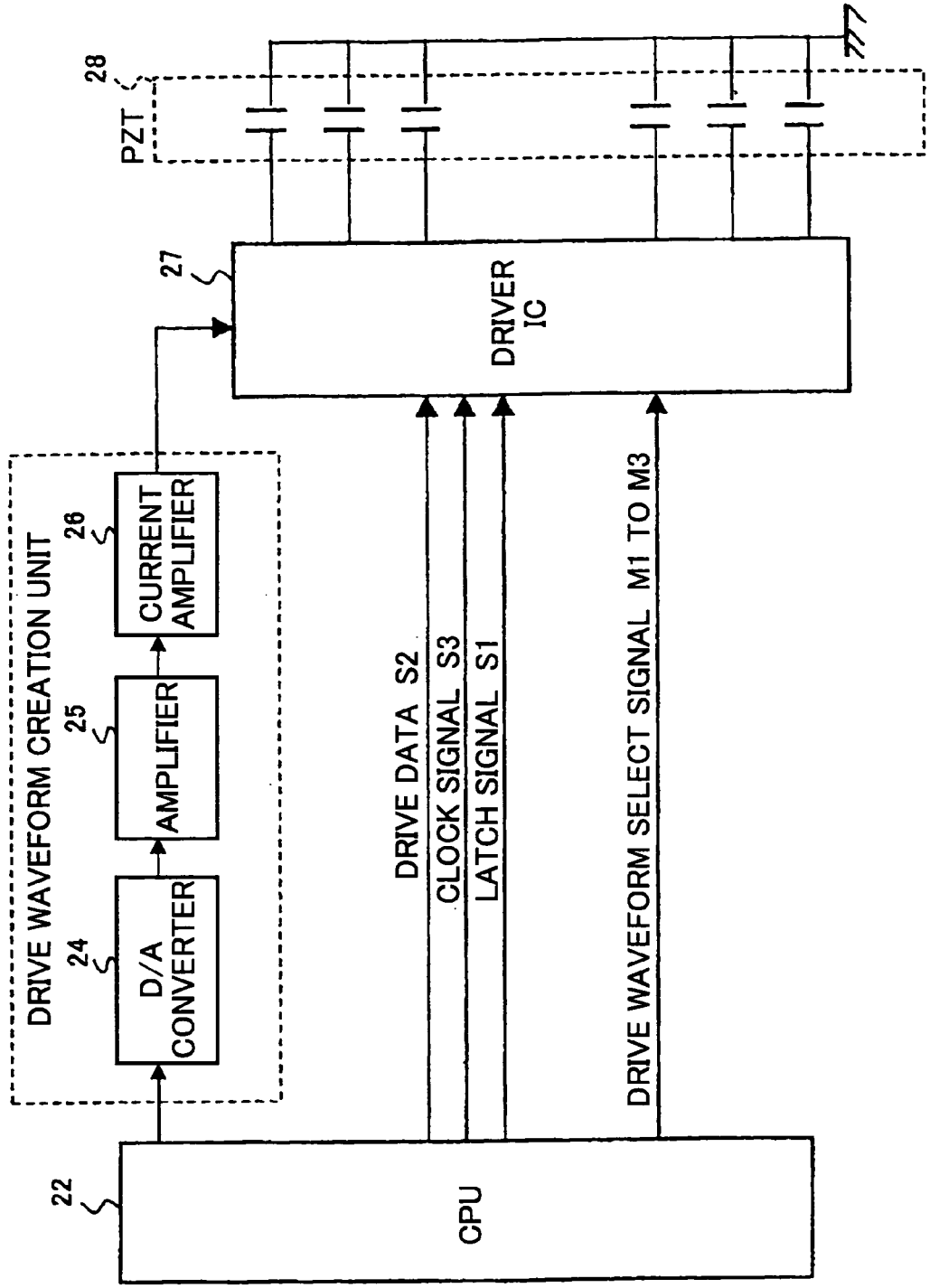
FIG. 7 is a diagram showing the composition of the drive circuit of the recording head.
Figure 8:
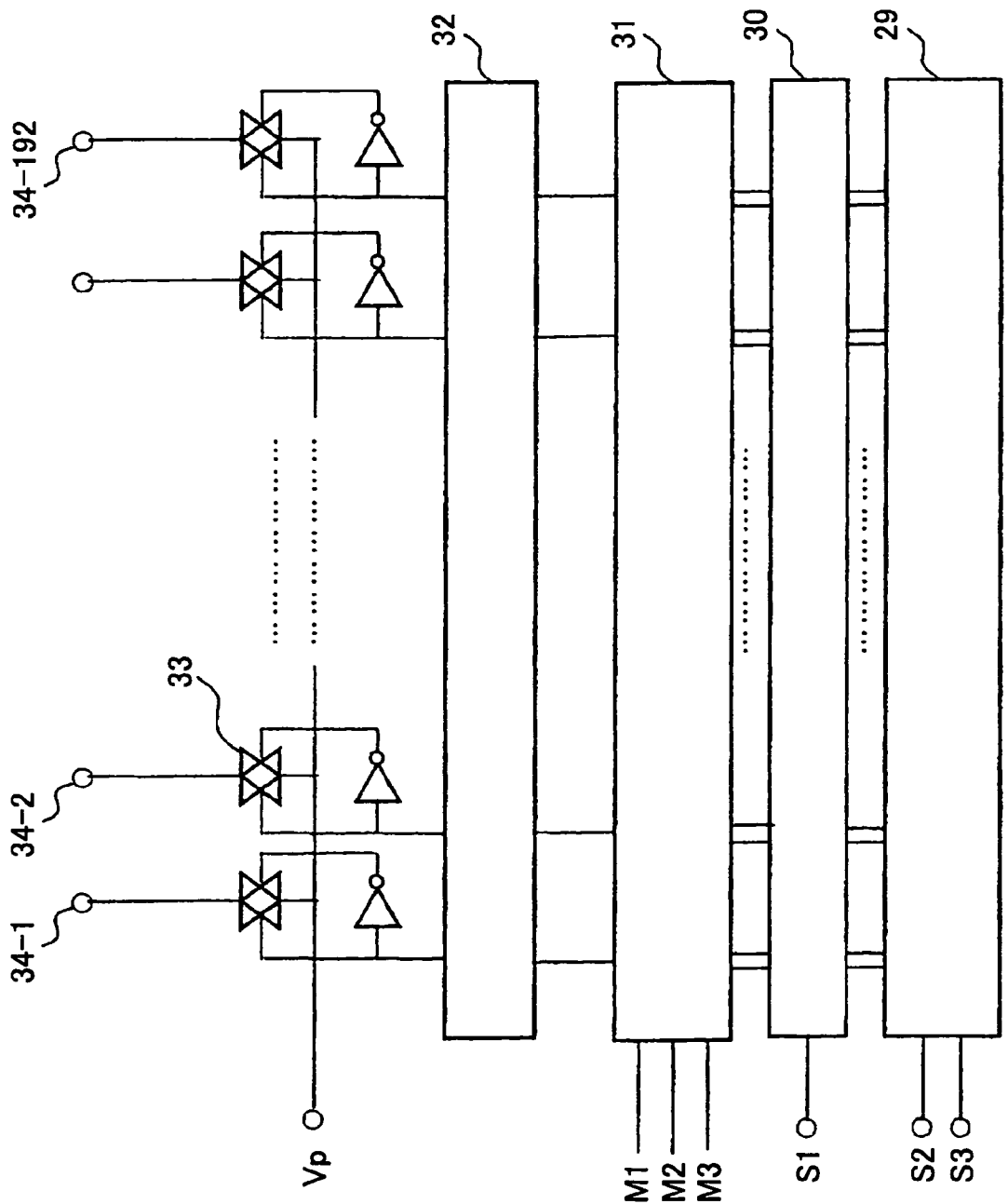
FIG. 8 is a diagram showing the example of the driver IC.

FIG. 6A, FIG. 6B, FIG. 6C, and FIG. 6D show the drive waveform of the recording head, FIG. 7 shows the drive circuit (which corresponds to the head drive unit shown in FIG. 5) of the recording head, and FIG. 8 shows the example of the driver IC.

In the data-processing unit 17 of FIG. 5, and the printing control unit 18, the each-direction transformation corresponding to the row of the printing head and the creation of the 2-bit drive data signal required in order to have desirable control of striking the printing head in any direction to the large drop, the small drop, and the three non-printing values are performed, and printing data is sent to the head drive circuit according to the drive periodicity of the recording head as a drive data signal S2.

Therefore, as a drive data signal S2, it becomes the number twice the number of the bits of the channels. As the signal sent to the head drive circuit is the drive data.

The latch signal S1 for retaining in the latch circuit 30, when the clock signal S3 for making it shift by the shift register 29 in the driver IC 27 and the drive data in the shift register are assembled the number of the channels, the dot of the size which forms the image dot for the drive waveform.

The drive waveform pulsing signal (M1-M3) for choosing the drive waveform (FIG. 6D) corresponding to the (large drop) and the drive waveform (FIG. 6B) corresponding to the small drop is sent.

On the other hand, as the drive waveform creation unit 23 which creates the drive waveform shown in FIG. 6A, transform the drive waveform data (digital signal) from CPU22 into the analog signal by D/A converter 24, and pass the amplifier 25 which amplifies this to actual drive voltage, and the current amplifier 26 for supplying the drive electric current of the recording head enough further—the drive waveform as shown in FIG. 6A is inputted into pinch off voltage of the driver IC 27.

In the driver IC 27, according to the drive data S2, one of the drive waveform pulsing signals (M1-M3, logic signal) is chosen by the data selector 31, and it is inputted into the gate of the transmission gate 33 which is the switching unit through the level shifter 32 which transforms the logic signal into the drive voltage level.

Therefore, the transmission gate 33 will be switched according to the length of the selected drive waveform pulsing signal, and the waveform of FIG. 6B for small drops and the waveform of FIG. 6D for large drops will be outputted to the output terminal (at the driver IC shown in FIG. 8, it is 34-1 to 34-192).

Moreover, in this embodiment, the drive waveform of FIG. 6C for medium drops can also be chosen.

According to these waveforms, PZT28 drives and can have desirable control of striking the small drop and the large drop in any direction.

In this embodiment—one drive waveform: FIG. 6—since the object for small drops, the object for inside drops, wave: FIG. 6B for large drops, FIG. 6C, and FIG. 6D are created from (A), the circuit and signal line which supply the drive waveform are desirable at one, and the miniaturization of the cost reduction, the circuit board, and the transmission line can be attained.

Although this drive waveform is optimized and the variation between the recording heads is corrected conventionally, in the present invention, change is not added to the drive waveform but the variation between the heads is corrected by the image-processing method.

Next, the image processing method will be explained in more detail.

Figure 9:
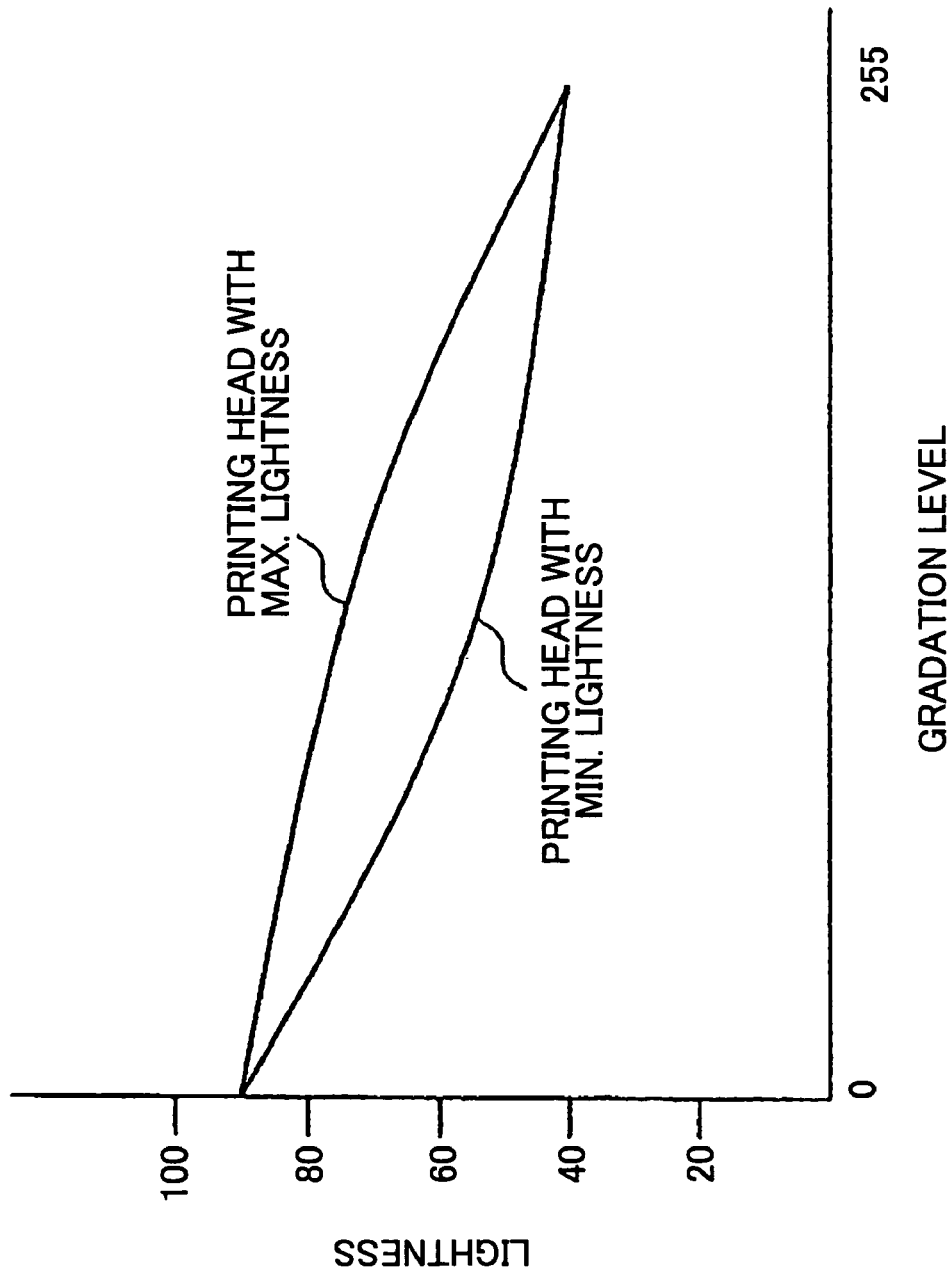
FIG. 9 is a diagram for explaining the relation between the gradation level and the lightness in the recording head.

FIG. 9 shows the result which changed the recording head, printed the color patch of middle the optical density (gradation levels 0-255) by image processing of gamma through and the dithering matrix, and measured the lightness.

Change considered only as the recording head, and the driving conditions (drive waveform, drive frequency), kind of recording paper, etc. are the same, and are printed.

The measurement of lightness—the gradation levels 0, 2, and 4 and . . . 0-254 measured every gradation level 2 in the condition of 250, 252, 254, and 255, and, finally measured the gradation level 255 in it.

X-Rite938 of X-Rite is used for measurement of the lightness shown in FIG. 9.

Since it is the variation in each printing head when the printing head changes so that I may be understood from FIG. 9, it is understood that the difference is in the lightness acquired also on the same driving conditions.

On the other hand, in the present invention, the gamma correction table is changed and the optimal gamma parameter for each recording head is chosen.

Figure 10A:
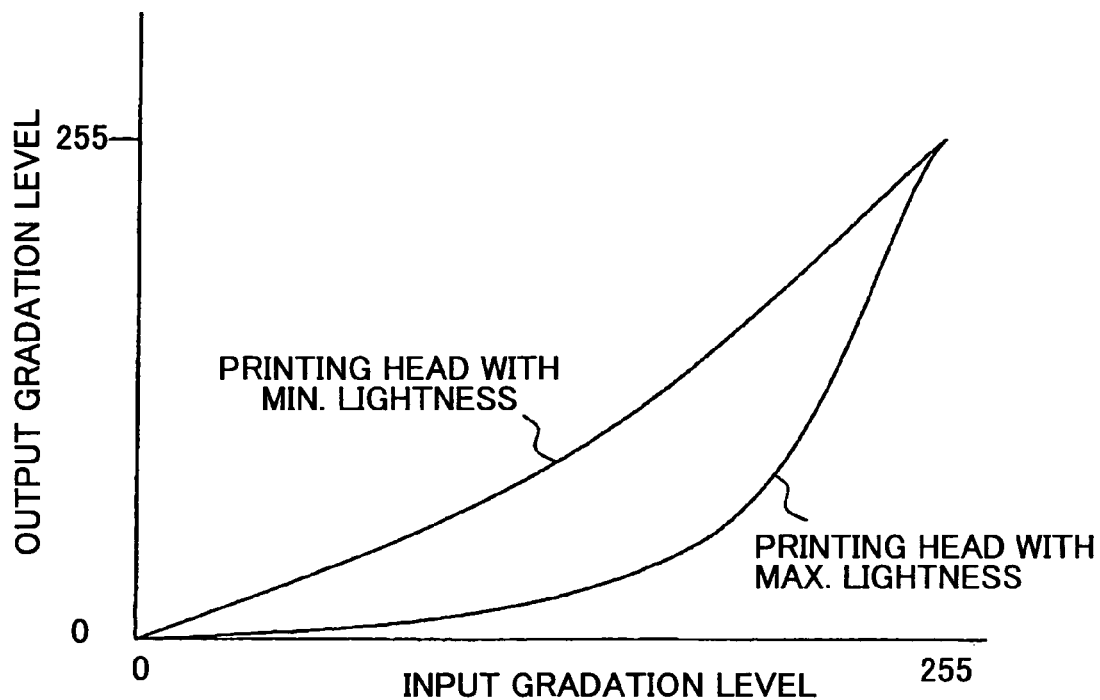
FIG. 10A and FIG. 10B are diagrams for explaining the examples of the gamma correction table.
Figure 10B:
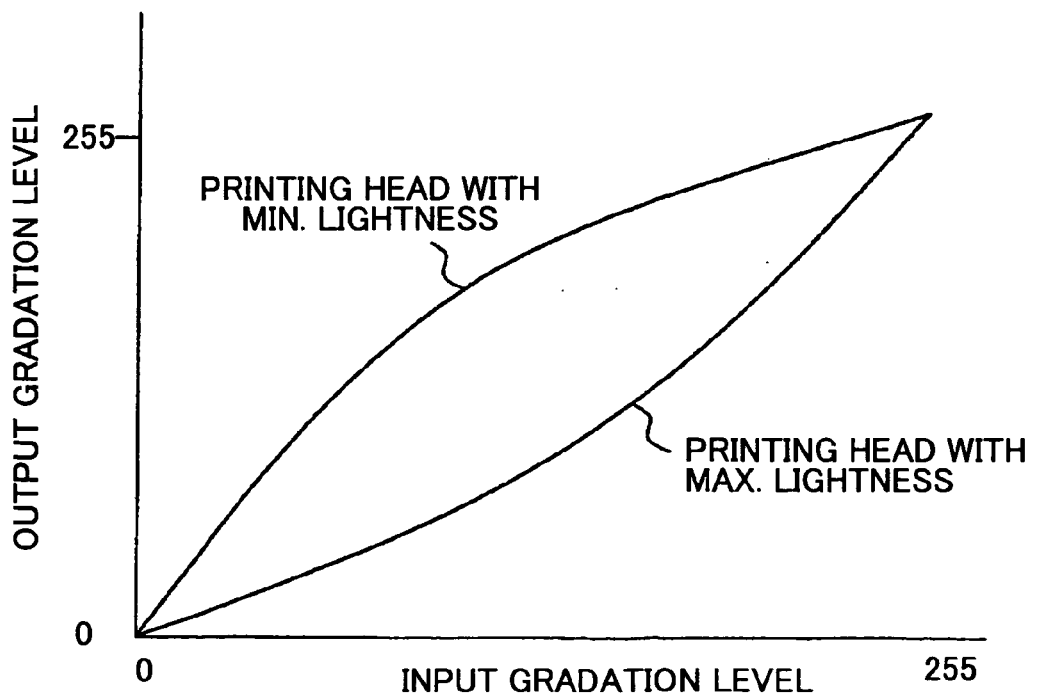

FIG. 10A and FIG. 10B show the example of the gamma correction table.

Although the gamma curve has width within the recess, FIG. 10A is not what is restricted to this, and may be able to be chosen from the recess to the projection like FIG. 10B.

These are decided by the characteristics of the ink-jet recording head. The plurality of gamma correction parameters are beforehand stored by the ink jet printer of the present invention, or the printer driver.

The gamma correction parameter is the table in which the output value is set up to the gradation levels 0-255. When performing image processing by the ink jet printer side, it is necessary to also memorize the plurality of gamma correction parameters in the ink jet printer, and they are usually stored by the memories, such as ROM.

Moreover, as shown in FIG. 4, when the gamma correction is performed by the printer driver of PC, the storage apparatus, such as the hard disk in PC, memorize.

According to the gamma correction parameter chosen from the plurality of gamma correction parameters which preserved the case where the latter printer driver performed image processing when the concrete embodiment is described further at the example for being the best for the ink-jet recording head, the printer driver performs image processing to the image data of the color patch, and outputs the image data to the ink jet printer.

In the ink jet printer side, according to the image data which received, the recording head is driven and the color patch is outputted to the recording paper.

Figure 11:
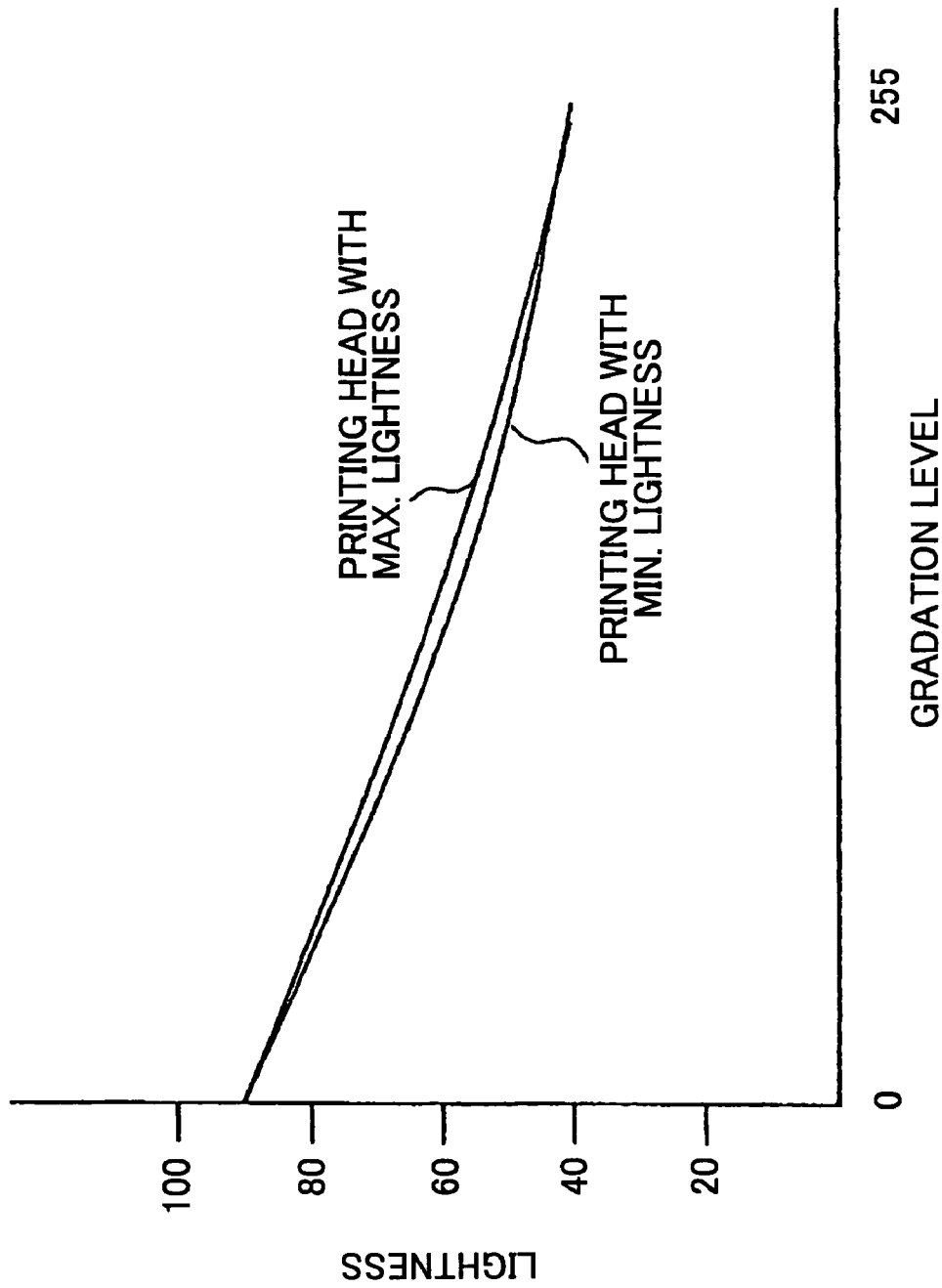
FIG. 11 is a diagram showing the results of measurement of the relation between the gradation level and the lightness when the optimal gamma correction parameter is selected and the different recording heads are used.

FIG. 11 shows the results of measurement of the relation between the gradation level and the lightness to the plurality of recording heads using the recording head which chose the respectively optimal gamma correction parameter.

Even if it changed the recording head as shown in FIG. 11 when the lightness is measured, the profile of the almost same lightness is able to be obtained.

Consequently, by performing image processing in the printer or printer driver using the selected gamma correction parameter, when the ink jet printer is created by these recording heads, even if which ink jet printer performed image creation, the almost same image quality is obtained.

Moreover, in this embodiment, the gamma correction parameter can be chosen very easily only by creating and carrying out the color measurement of the image of the color patch, without disassembling especially the device, since the variation between the recording heads is detected by measuring lightness and the optimal gamma correction table is chosen.

Moreover, not in the recording head simple substance but in the state where it had been constructed as a printer, since the gamma correction parameter can be chosen, for example, it can carry out easily even in the assembly line of the factory, assembles, and becomes shortening of inspection time.

Moreover, it becomes possible not only the process of the factory but for the user to carry out.

Next, the example which measures lightness on one gradation level will be explained as the ink-jet printing device of the embodiment 2.

When there is the relation that the different profiles of the gradation levels of the recording head and lightness do not cross so that I may be understood from the relation of the gradation level and lightness as shown in FIG. 9 (this relation is generally realized), it is measuring the lightness of the gradation level of one somewhere, and it is possible for it to be decided uniquely of which profile it will be the relation, and to get to know the rank of the recording head.

Therefore, it is possible to measure the lightness of one gradation level, to determine which gamma correction table is used from the value, and to perform image processing using the gamma correction table.

Time which selection of the gamma correction parameter takes can be shortened overwhelmingly by this, and the time of process inspection is shortened.

Next, the discharging characteristics that the recording heads differ instead of lightness can be measured as the ink-jet printing device of the embodiment 3, and the gamma correction parameter can also be chosen.

Recently, as process inspection in the factory, the characteristics of the recording head are measured, and the rank of the recording head is attached or it sorts.

Then, the characteristics are seen and the gamma correction parameter is chosen.

As characteristics of the recording head, the ink drop velocity Vj is measured and the gamma correction parameter is changed according to the size of the velocity difference with the target.

For example, since how to spread when reaching paper becomes large and the diameter of the dot becomes large when the ink drop velocity Vj is the quick recording head, the small gamma correction value is chosen as a gamma correction parameter.

On the contrary, when Vj is small, the larger gamma correction parameter is chosen.

Next, according to the discharging characteristics about the ink drop volume, the example which chooses the gamma correction parameter will be explained as the ink-jet printing device of the embodiment 4.

In the ink-jet printing device of the embodiment 4, the ink drop volume Mj is measured and the gamma correction parameter is changed according to the volume difference with the target ink drop volume Mj.

For example, the diameter of the dot when adhering to paper becomes small when the ink drop volume Mj is small, and the larger gamma correction parameter is chosen. Conversely, the diameter of the dot becomes large when the ink drop volume Mj is large, and the smaller gamma correction parameter is chosen.

Furthermore, the ink-jet printing device of the embodiment 5 will be described.

The ink-jet printing device of the embodiment 1 shown in FIG. 1 is the color ink jet printer which used the recording head of the four colors of Y, M, C, and K.

With this color ink jet printer, about each head, each discharging characteristics are measured and the gamma correction parameter is chosen for every recording head.

What is necessary is to measure the ink drop velocity Vj and the ink drop volume Mj as characteristics of the recording head, as mentioned above, and just to change the gamma correction parameter.

Generally, the physical-properties value (for example, surface tension and viscosity which influence discharging characteristics) changes somewhat with colors of the ink. If the surface tension differs from viscosity, variation will arise in discharging characteristics.

Moreover, the profile (relation between the gradation level and lightness) of lightness also changes with colors. Therefore, even if the difference in the physical-properties value and the difference in discharging characteristics arising from the ink arise by measuring discharging characteristics (Vj, Mj) for every color, and choosing the gamma correction parameter according to each discharging characteristics, the optimal gamma correction parameter for each record printing head can always be chosen.

The plurality of gamma correction parameters are beforehand stored by the color ink jet printer or printer driver of the present invention.

The gamma correction parameter here is the table on which the output value is set up to the gradation levels 0-255 as mentioned above.

When performing image processing by the ink jet printer side, it is necessary to also memorize the plurality of gamma correction parameters which responded to the color in the ink jet printer, and they are usually stored by the memories, such as ROM.

Moreover, as shown in FIG. 4, when the gamma correction is performed by the printer driver of PC, the storage apparatus, such as the hard disk in PC, memorize.

Out of the plurality of gamma correction parameters which preserved the case where the latter printer driver performed image processing when the concrete embodiment is described further at the example, according to the gamma correction parameter for every color chosen for being the best for the recording head for every color carried, the printer driver performs image processing to the image data of the color patch, and outputs the image data to the ink jet printer.

In the ink jet printer side, according to the image data which received, the recording head is driven and the color patch is outputted to the recording paper.

Even if the recording head changed as shown in FIG. 11 when the lightness is measured, the profile of the almost same lightness is able to be obtained.

Consequently, by performing image processing in the printer or printer driver using the selected gamma correction parameter, when the ink jet printer is created by these recording heads, even if which ink jet printer performed image creation, the almost same image quality is obtained.

Next, the color ink jet printer of the embodiment 6 will be explained.

Figure 12:
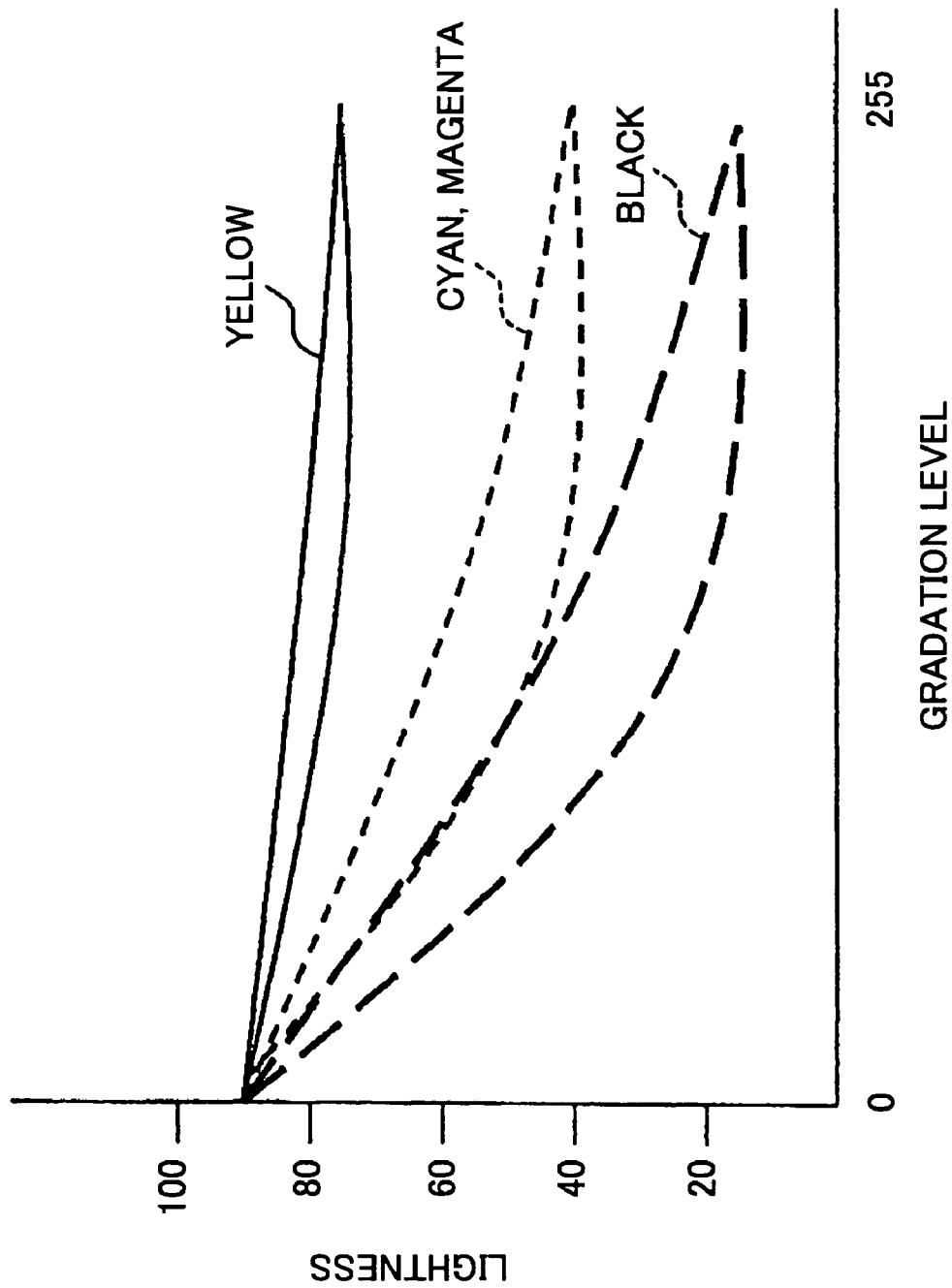
FIG. 12 is a diagram showing the relation between the gradation level and the lightness for every color, and the variation thereof.

FIG. 12 shows the relation between the gradation level and the lightness for every color, and the variation thereof. As is apparent from FIG. 12, the ranges of the size and lightness variation (size of variation) from which the lightness over the gradation level changes for every color differ.

Then, it is desirable to measure the lightness of each color and to choose the gamma correction parameter from each lightness for every color.

Even if the recording head from which characteristics differ for every color is used because this performs image processing using the gamma correction parameter which makes it possible to select the optimal gamma correction parameter, and is optimized for every color of this in each color, it is possible to obtain the always same image quality.

Moreover, the method of selection of the gamma correction parameter is described in more detail from the result which evaluated the image-processing method of the present invention.

With the color ink jet printer which carried the recording head of Y, M, C, and K, the recording head of Y, M, and K remained as it is, the cyan C is exchanged for the plurality of printing heads, and the color patch image outputted using the same gamma correction parameter is compared.

The outputted color patches are the cyan C, the green G, and the color patch of the black B.

Consequently, when lightness exceeded the average ±10, the being clear difference is found and it turns out that it is necessary to make it become less than ±five the optimal the less than ±ten averages.

Therefore, when the optimal gamma correction parameter is chosen to the variation in the recording head, it is necessary to create the gamma correction parameter so that the output image may fall within the range of the limits.

Moreover, as for the relation between the gradation level and lightness, the profile changes greatly with colors. For example, in the case of the yellow Y, to the gradation levels 0-255, although the lightness difference is as small as ten or less, in the case of the black K, there is the difference very much or more with 70.

Moreover, the variation over the recording head of the yellow Y is also small, and that of the black K is large. Therefore, if the kind of gamma correction parameter is set up to the variation in lightness so that it may become within a certain lightness difference, in the kind of number, the difference will arise in the yellow Y and the black K.

For example, dispersion between the recording heads of the lightness of the yellow Y is 4, the black K is 14, and if the variation in lightness uses the one kind of gamma correction parameter to 2, the yellow Y will end with the two kinds of gamma correction parameters to the eight kinds of gamma correction parameters being required for the black K.

Therefore, according to the color, it becomes possible to change the number of the kinds of gamma correction parameter, and simplification of selection and reduction of the memory or the hard disk which memorizes the gamma correction parameter can be aimed at.

Next, the color ink jet printer of the embodiment 7 will be explained.

When measuring the lightness of the yellow Y and choosing the gamma correction parameter of the recording head of the yellow, lightness change of the yellow Y is small among the gradation levels 0-255, and it is necessary to carry out very highly precise measurement as shown in FIG. 12.

Moreover, it is easy to produce the error in measurement. Therefore, the optical density of the color patch is measured to the change which measures lightness, and the gamma correction parameter is chosen as it from the variation in the optical density.

Figure 13:
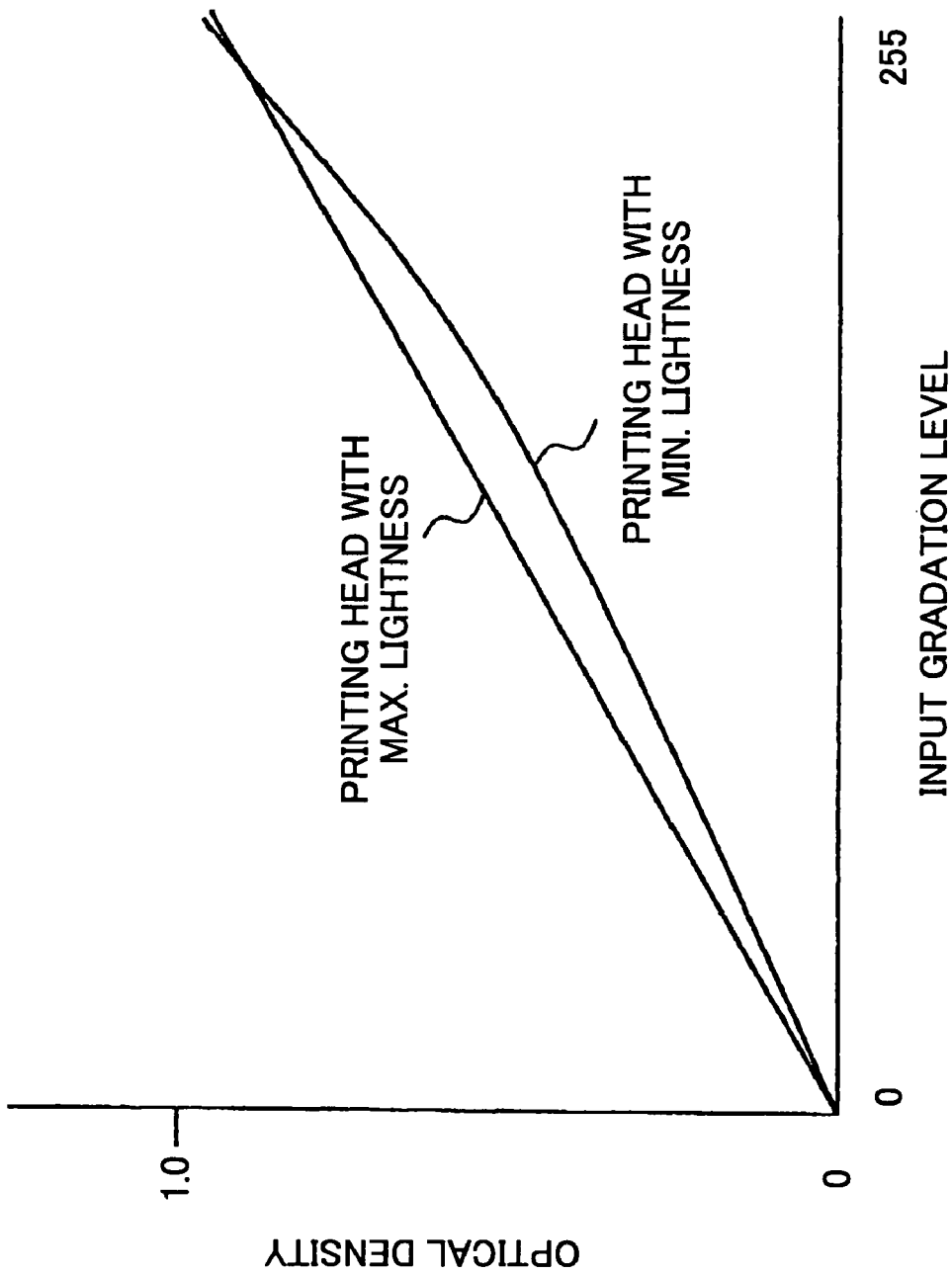
FIG. 13 is a diagram showing the relation between the gradation level and the optical density of the yellow Y, and the variation.

FIG. 13 shows the relation between the gradation level and the optical density of the yellow Y, and its variation.

As shown in FIG. 13, in the case of the optical density, to the gradation level, it changes comparatively a lot and is easy to distinguish the variation between the recording heads. Therefore, the optical density of the color patch of the yellow Y is measured and the gamma correction parameter is chosen from the optical density value.

Next, the correction method of dispersion between the heads of the discharging characteristics in the ink jet printer of the embodiment 8 will be explained.

Figure 14:
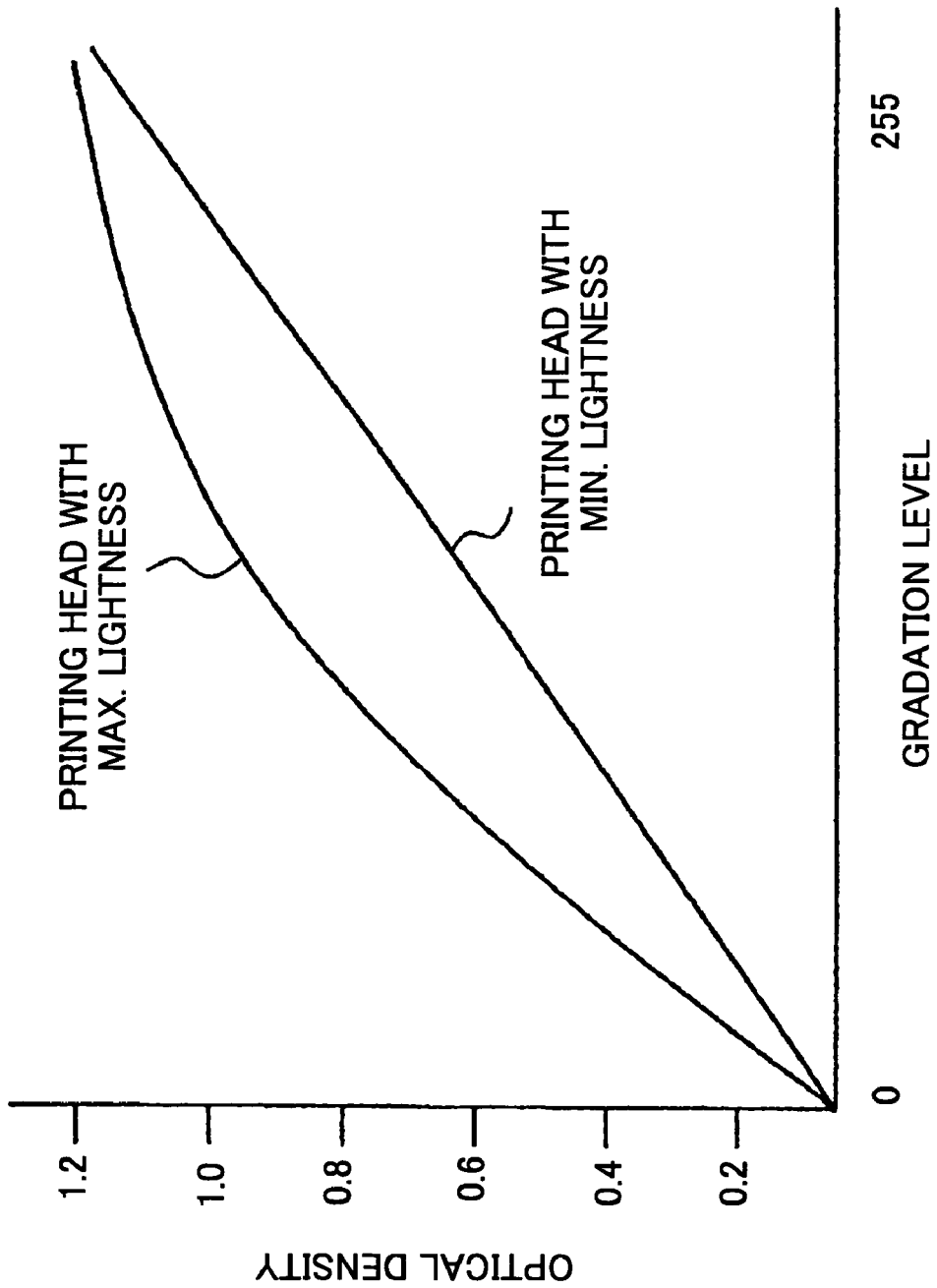
FIG. 14 is a diagram showing the relation between the gradation level and the optical density in the recording head.

FIG. 14 shows the relation between the gradation level and the optical density in the recording head, and is the result of preparing some heads, changing the head, printing the color patch of middle the optical density (gradation levels 0-255) by image processing of gamma through and the dithering matrix, and measuring the optical density.

Change considered only as the head, and the driving conditions (drive waveform, drive frequency), kind of recording paper, etc. are the same, and are printed.

0-254 measured measurement of the optical density every gradation level 2 in the condition of the gradation levels 0, 2, and 4, . . . , 250, 252, 254 and 255, and, finally the gradation level 255 is measured. The X-Rite938 of X-Rite is used for measurement of the optical density.

As shown in FIG. 14, when the head changes, it turns out that the difference is in the optical density obtained also on the same driving conditions.

On the other hand, the gamma correction table is changed as shown in FIG. 10A, and the optimal gamma parameter for each head is chosen.

As a gamma correction table, although the gamma curve has width within the recess, FIG. 10A is not having restricted to it, and may be able to be chosen from the recess to the projection as in FIG. 10B. These are decided by the characteristics of the ink-jet head.

The plurality of gamma correction parameters are beforehand stored by the ink jet printer or printer driver of the present invention.

The gamma correction parameter here is the table on which the output value is set up to the gradation levels 0-255. When performing image processing by the ink jet printer side, it is necessary to also memorize the plurality of gamma correction parameters in the ink jet printer, and they are usually stored by the memories, such as ROM.

Moreover, as shown in FIG. 6, when the gamma correction is performed by the printer driver of PC, the storage apparatus, such as the hard disk in PC, memorize. According to the gamma correction parameter chosen from the plurality of gamma correction parameters which preserved the case where the latter printer driver performed image processing when the concrete embodiment is described further at the example for being the best for the ink-jet head, the printer driver performs image processing to the image data of the color patch, and outputs the image data to the ink jet printer.

The selection method of the optimal gamma correction parameter will be described.

Beforehand, the table is prepared for the optical density in the predetermined gradation level, and the relation of the optimal gamma correction parameter.

Table 1 is an example of the table and given below. Since the optimal gamma correction parameter in the optical density with various preparing the plurality of levels as a predetermined gradation level is obtained, and the gamma correction parameter can be chosen with more sufficient accuracy as shown in Table 1, it is desirable.

Moreover, Table 1 is each gradation level, and is the table having shown the kind (number) of gamma correction parameter to choose, and the range of the optical density as which it is chosen.

TABLE 1

Gamma Correction Para. Select. Table of Black Ink

| Gradation Level: | Gamma Correction Parameter Number (kind) | | | |
|---|---|---|---|---|
| | 1 | 2 | 3 | 4 |
| 130 | 0.81 | 0.77 | 0.73 | 0.70 |
| | — | — | — | — |
| | 0.77 | 0.73 | 0.70 | 0.66 |
| 150 | 0.90 | 0.86 | 0.82 | 0.79 |
| | — | — | — | — |
| | 0.86 | 0.82 | 0.79 | 0.75 |
| 170 | 0.98 | 0.94 | 0.90 | 0.87 |
| | — | — | — | — |
| | 0.94 | 0.90 | 0.87 | 0.83 |

TABLE 1-continued

Gamma Correction Para. Select. Table of Black Ink

| Gradation Level: | Gamma Correction Parameter Number (kind) | | | |
|---|---|---|---|---|
| | 5 | 6 | 7 | 8 |
| | 0.66 | 0.63 | 0.59 | 0.55 |
| 130 | — | — | — | — |
| | 0.63 | 0.59 | 0.55 | 0.50 |
| | 0.75 | 0.72 | 0.68 | 0.65 |
| 150 | — | — | — | — |
| | 0.72 | 0.68 | 0.65 | 0.61 |
| | 0.83 | 0.79 | 0.76 | 0.72 |
| 170 | — | — | — | — |
| | 0.79 | 0.76 | 0.72 | 0.68 |

The optical density of the color patch is measured for each of the plurality of actually printed gradation levels.

It is necessary to perform printing at this time by gamma through (for the input gradation level and the output gradation level to be equal).

The gamma correction parameter in each gradation level is chosen from the measured optical density value and Table 1.

Let most things be the gamma correction parameters of this head by the kind of gamma correction parameter obtained on the plurality of gradation levels.

Figure 15:
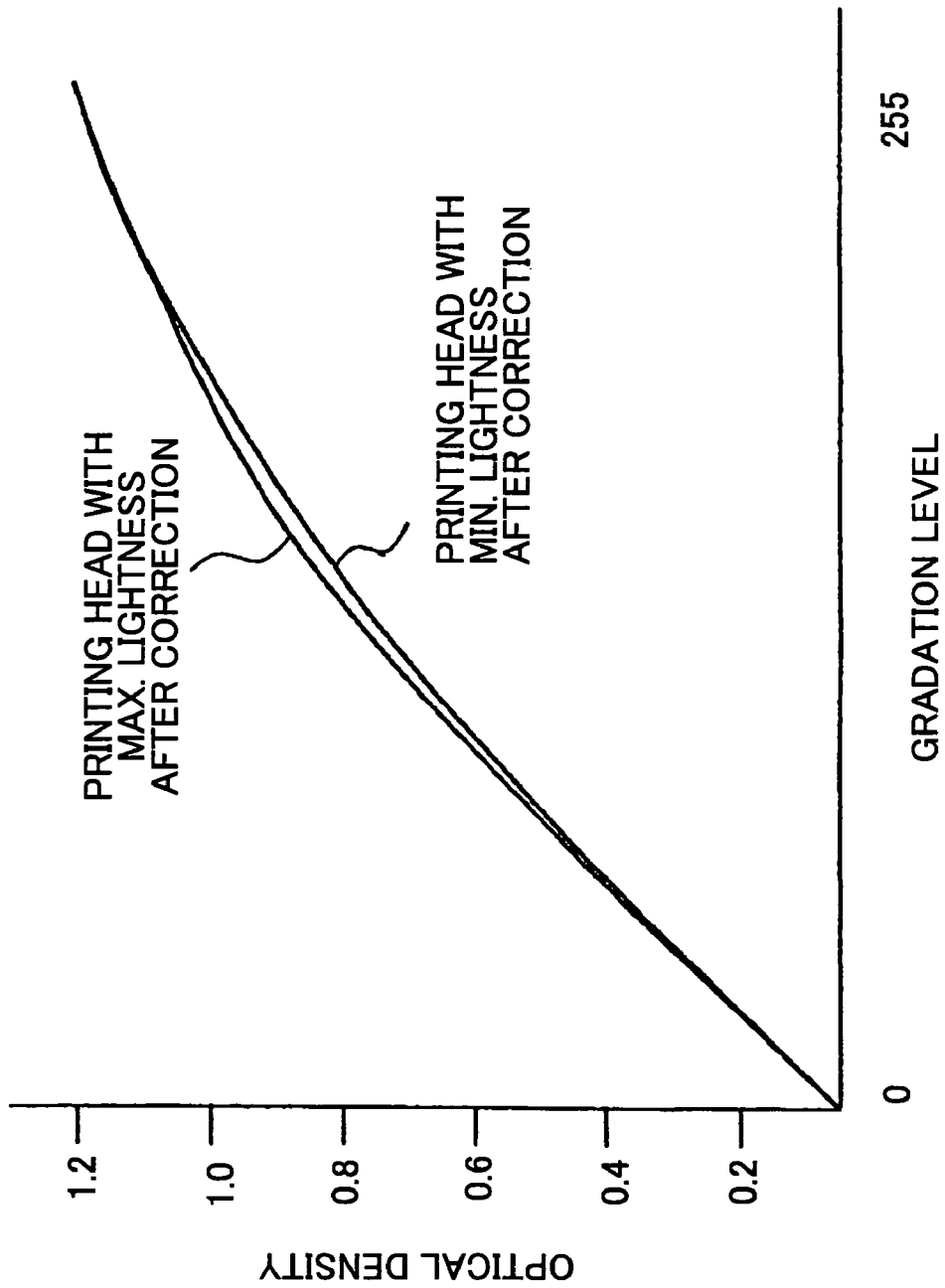
FIG. 15 is a diagram showing the results of measurement of the relation between the gradation level and the lightness when the optimal gamma correction parameter is selected and the different recording heads are used.

FIG. 15 is the view which chose the optimal gamma correction parameter and in which showing the result which measured the relation between the gradation level and lightness using the different recording head.

In this way, using the selected gamma correction parameter, according to the image data which received, the head is driven and the color patch is outputted to the recording paper by the ink jet printer side.

Even if the head changed as shown in FIG. 15 when the optical density is measured, the profile of the almost same optical density is able to be obtained.

Consequently, by performing image processing in the printer or printer driver using the selected gamma correction parameter, when the ink jet printer is created with these heads, even if which ink jet printer performed image creation, the almost same image quality is obtained.

Moreover, in this embodiment, since what is necessary is just to create the image of the color patch and to carry out the color measurement without disassembling especially the device since the variation between the heads is detected by measuring the optical density and the optimal gamma correction table is chosen, the gamma correction parameter can be chosen very easily.

Moreover, not in the head simple substance but in the state where it is composed as a printer, since the gamma correction parameter can be chosen therefore, it can carry out easily even in the assembly line of the factory, assembles, and becomes shortening of inspection time.

Moreover, it becomes possible not only the process of the factory but for the user to carry out. As another embodiment, the example which measures the optical density on one gradation level is shown.

Figure 16:
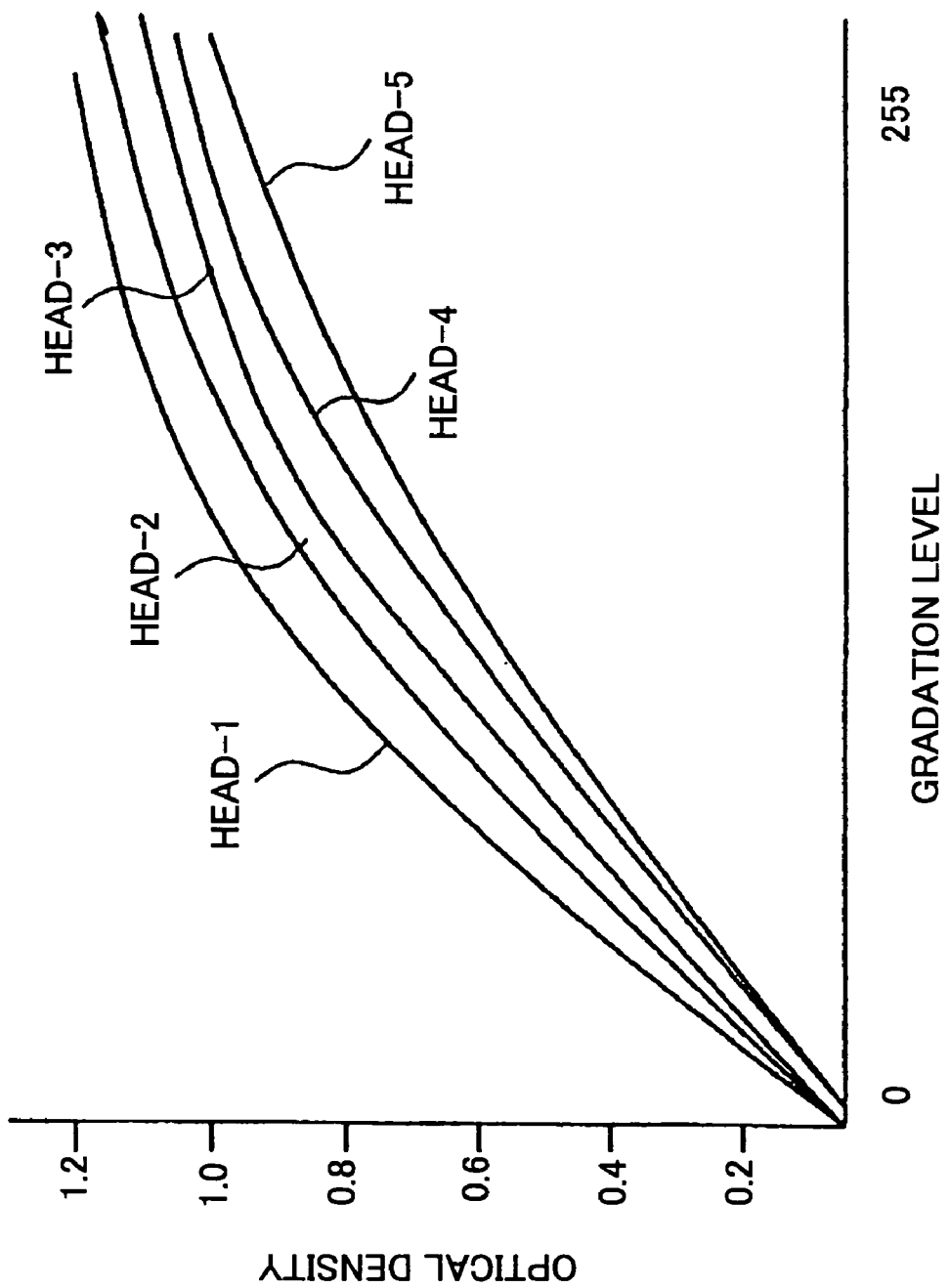
FIG. 16 is a diagram showing the relation between the gradation level and the optical density in the different head.

FIG. 16 is the view in the different head showing the relation between the gradation level and the optical density.

When there is the relation that the different profiles of the gradation levels of the head and the optical density do not cross so that the relation of the gradation level and the optical density as shown in FIG. 16 may show (this relation is generally realized), it is measuring the lightness of the gradation level of one somewhere, and it is possible for it to be decided uniquely of which profile it will be the relation, and to get to know the rank of the head.

Therefore, it is possible to measure the optical density of one gradation level, to determine which gamma correction table is used from the value, and to perform image processing using the gamma correction table.

Thereby, the time which selection of the gamma correction parameter takes may be overwhelmingly short, and the time of process inspection is shortened.

Moreover, another embodiment in the color ink jet printer will be explained.

Figure 17:
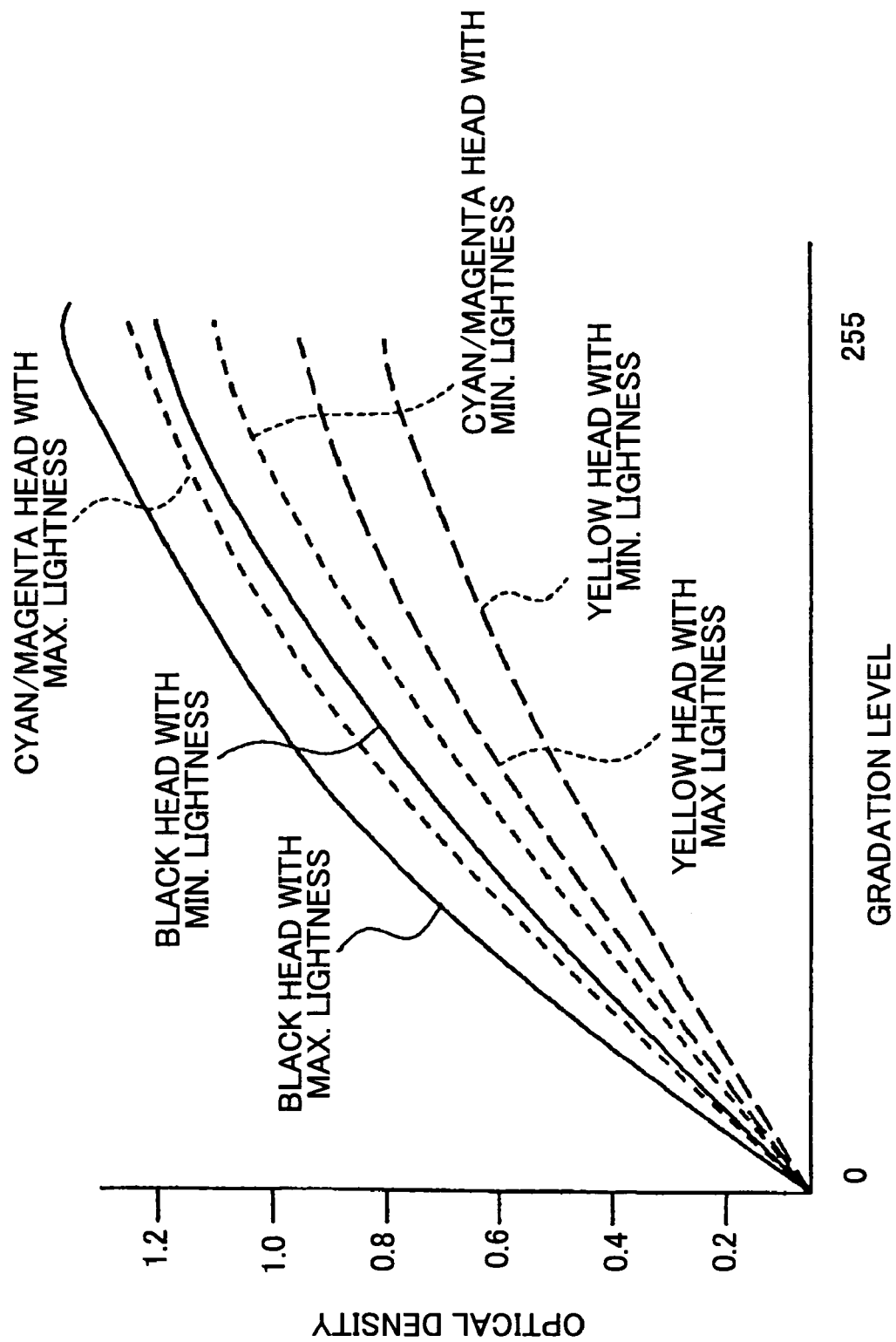
FIG. 17 is a diagram showing the relation between the gradation level and the optical density for every color, and the variation thereof.

FIG. 17 is the diagram in which the relation and variation of the gradation level and the optical density for every color are shown.

The ranges of the size and the optical density variation (size of variation) from which the optical density to the gradation level changes differ for every color.

Then, it is desirable to measure the optical density of each color and to choose the gamma correction parameter from each the optical density for every color.

Namely, the color patch which created the selection table as shown in Table 1 in each optical density range, and measured it for every color.

Even if the head from which characteristics differ for every color is used by performing image processing using the gamma correction parameter which became possible choosing the optimal gamma correction parameter, and is optimized for every color of this in each color by comparing the table, it is possible to obtain the same image quality invariably.

As the same image quality is obtained, when the gray and black are made from the three colors of Y, M, and C, it says making it the difference of the saturation of the gray by the printer or black become ten or less.

By making the difference of saturation or less into ten, the difference in the color between the printers will not be recognized, but the almost same color will be obtained from the experimental results.

If the selection method of the gamma correction parameter of this embodiment is described still more concretely, the color patch of the gradation levels 0-255 will be first printed in Y, M, C, and K each color with the ink jet printer.

It is necessary to use the gamma correction value when measuring the relation between the optical density and the gamma correction parameter beforehand as a gamma correction value at this time.

In this embodiment, when it asked for the relation between the optical density and the gamma correction parameter beforehand, it carried out by gamma through (the input and the output are the gamma table of the relation of 1 to 1).

Therefore, it outputted by gamma through also at the time of the output of the color patch.

Moreover, half-tone processing used dithering. In this way, the optical density of the color patch which is equivalent to the gradation level 128 out of the outputted color patch as a gradation level specification is decided to be is measured.

The optimal gamma correction parameter for this recording head is chosen from the relation between the measured optical density, the optical density which it creates beforehand, and the gamma correction parameter. Thus, image processing is performed using the selected gamma correction parameter.

Also to another ink jet printer, the optical density is measured by the same method and the optimal gamma correction parameter for the ink jet printer is chosen from the optical density.

When the color image outputted with these two ink jet printers is compared, both are able to obtain the almost same image quality.

When both ink jet printers created and compared the image using the same gamma correction parameter for comparison, it became the image from which the optical density of the image and the hue differed.

Next, the ink jet printer of the embodiment 9 will be explained.

It is the inspection process of the factory etc. and the gamma correction parameter chosen as described above is displayed on the main part of the ink-jet printing device.

On the other hand, the printer driver is required in order to create the image with this ink jet printer.

Generally, the printer driver is used, after installing in PC to which the ink jet printer is connected. In this way, after being installed in PC, it is necessary to the printer driver to direct the gamma correction parameter suitable for this ink jet printer.

It becomes possible to direct the gamma correction parameter used for the printer driver by displaying the gamma correction parameter chosen as the main part of the ink jet printer as this method as mentioned above.

The display method to the main part of the ink jet printer has desirable number, sign, etc. which show the kind of for example, gamma correction parameter.

The gamma correction table on which the optimal gamma correction parameter for the connected ink jet printer is set up, and the output value is set up to the gradation levels 0-255 in inputting this display data into the printer driver of PC is chosen, and it is used with the printer driver. Moreover, you may display the gamma correction parameter used for the printer driver as an embodiment 10 on the recording head instead of the main part of the ink jet printer.

By displaying on the recording head, when printing head exchange is performed while the user used it, the setup of the optimal gamma correction parameter is attained to the exchanged recording head.

Figure 18:
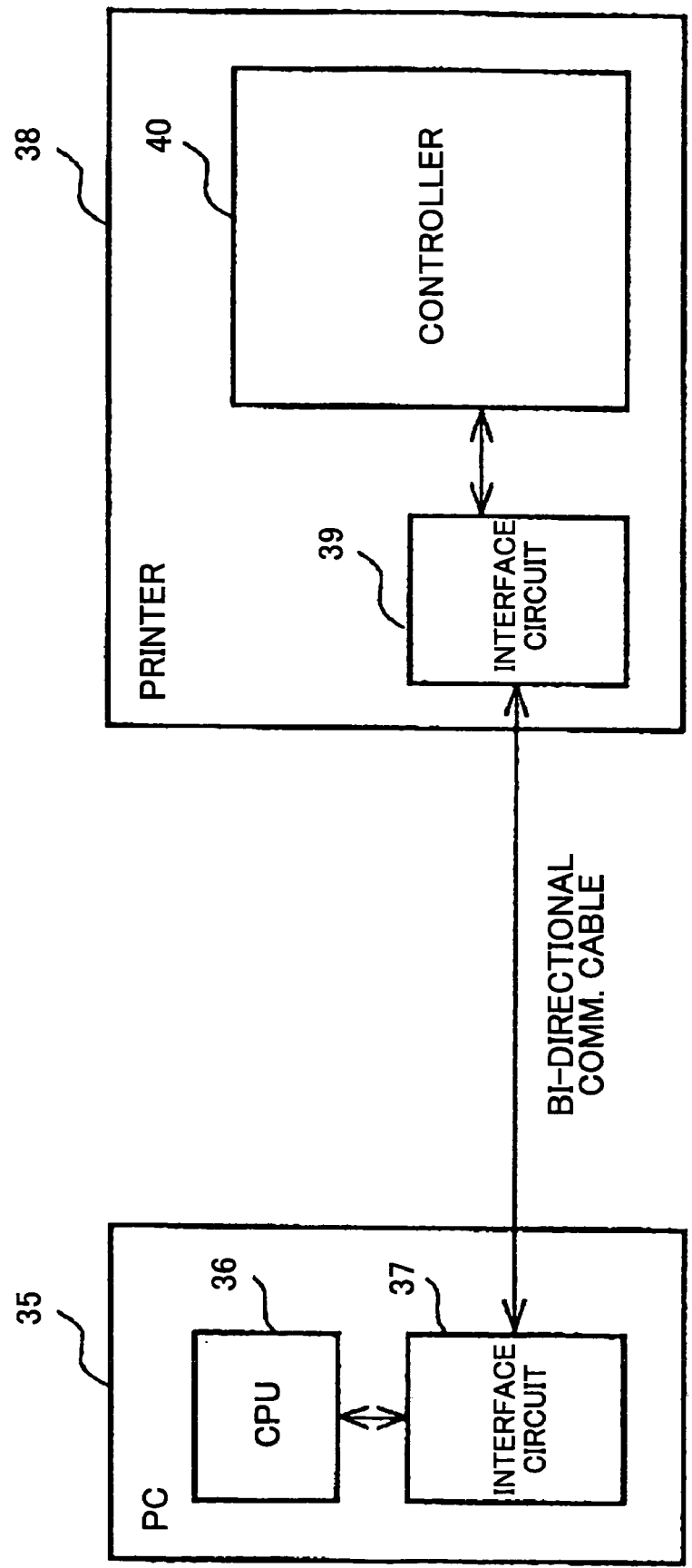
FIG. 18 is a block diagram showing the composition of the image forming system of the embodiment 11.

Next, FIG. 18 shows the composition of the image forming system of the embodiment 11.

In the image forming system of the embodiment 11, the personal computer (PC) 35 and the ink jet printer 38 are connected through the bi-directional I/F (for example, Centronics I/F) or the network I/F 37 and 39 so that the bi-directional communication is possible.

The image data after the processing is performed by the image-processing unit of the printer driver of the PC 35 or the various status information of the ink jet printer 38 is bi-directionally transmitted between the PC and the ink jet printer through the network interfaces 37 and 39.

The printer driver of the PC stores into the memory the kinds of the gamma correction parameters (or the gamma correction table itself) obtained from the ink jet printer by the bi-directional communication. Thereby, the optimal gamma correction parameter for the ink jet printer connected to the PC can be recognized by the printer driver side, and it is possible to perform the image processing according to the optimal gamma correction parameter.

Next, the image forming system of the embodiment 12 will be explained. In this image forming system, the ink jet printer and the PC are connected through the bi-directional I/F (for example, Centronics I/F) or network I/F so that the bi-directional communication is possible.

The image data after the various processings are performed by the image-processing unit of the printer driver of the PC or the various status information of the ink jet printer is bi-directionally transmitted between the PC and the ink jet printer through the I/F.

The optimal gamma correction parameter for the ink jet printer is stored in the memory, for example, the ROM etc. in the ink jet printer. Moreover, the CPU and the I/F circuit of the ink jet printer are capable of transmitting to the PC through the I/F the gamma correction parameter stored in the memory upon receipt of a request from the PC.

On the other hand, the printer driver of the PC stores into the memory the data which indicates the kind of the optimal gamma correction parameter obtained from the ink jet printer by the bi-directional communication.

The plurality of gamma correction tables in which the output levels corresponding to the gradation levels 0-255 and related with the data indicating kinds of the gamma correction parameters are set up are stored in the printer driver. By using the gamma correction tables, the optimal gamma correction parameter for the ink jet printer connected to the PC can be recognized by the printer driver side, and it is possible to perform the image processing according to the optimal gamma correction parameter.

Next, the thermal printing device of the embodiment 13 will be explained.

Figure 19:
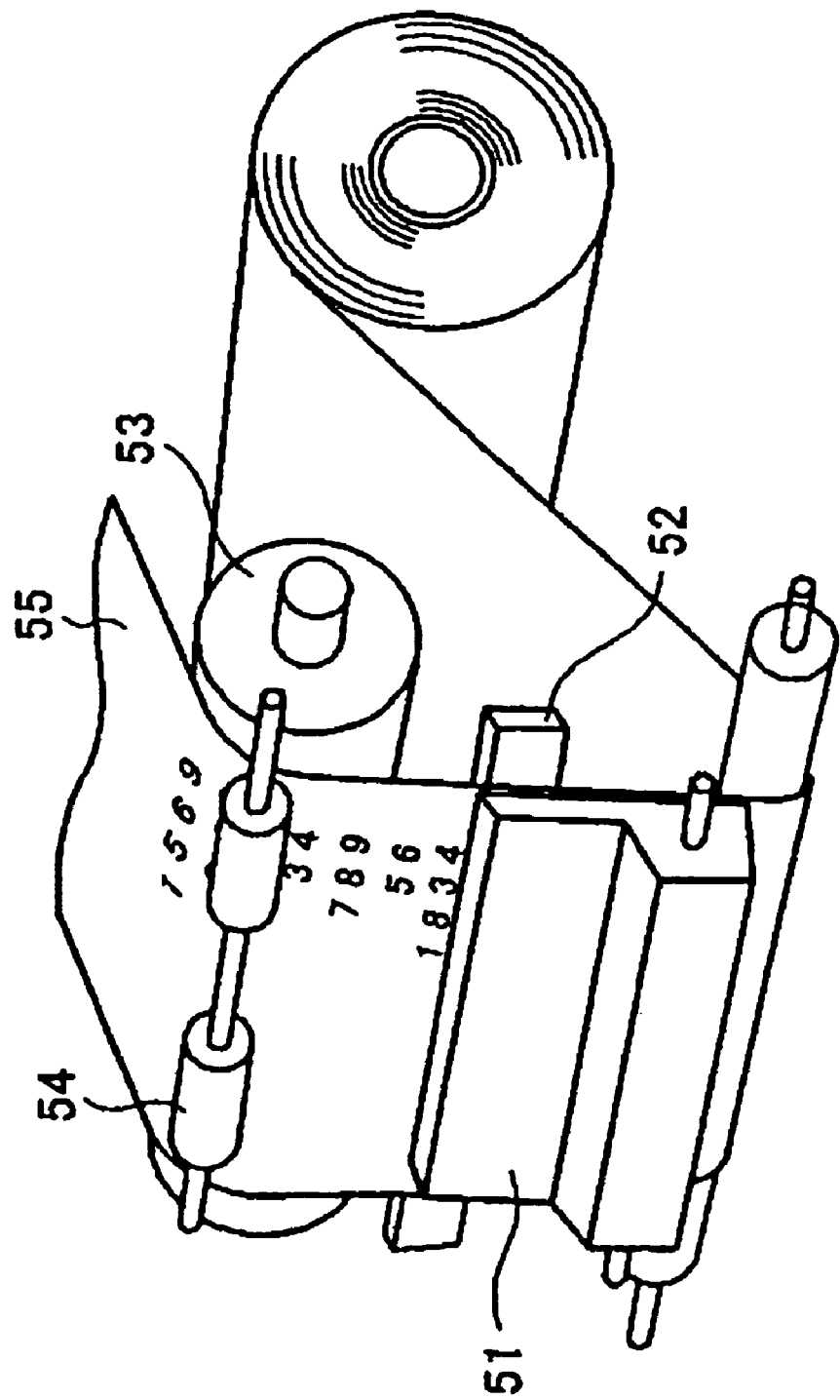
FIG. 19 is a perspective view of the principal part of the thermal printing device of the embodiment 13.

FIG. 19 shows the mechanical part of the thermal printing device as the serial printer in which the present invention is embodied.

The thermal printing device shown in FIG. 19 is the printer of the line printer type using the thermal recording head 51 in which the plurality of heating elements are arranged in line according to the width of the recording medium.

The thermal recording head 51 is formed so that it may contact with the suitable pressure to the platen 52 countered and prepared through the recording medium.

With the paper sending roller 53 and the pressure roller 54, the thermal paper 55 which is the recording medium is pulled out from the thermal paper roll, and is sent between the thermal recording head 51 and the platen 52.

If the thermal paper 55 detects having arrived at the predetermined position, the image signal will be sent to the thermal recording head 51, each heating element will be made to generate heat according to the image signal, and it will print to thermal paper 55.

In addition, although the example of FIG. 15 showed the example which uses thermal paper, transfer printing can also be performed using the plain paper and the copy sheet.

As described above, having paid one's attention to the gamma parameter in the various parameters of image processing does not require cost with last thing, because creation and the correction are easy as a parameter.

Although the same management is possible also for the CMM table in image processing, the environment of exclusive use is required for CMM table creation, and the correction is not easy, even if it is going to adjust by the user's own hand, after there being no flexibility and crossing to the user's hand as a product in the stage of development, since it is the work which time and effort requires very much.

On the other hand, if it is the gamma parameter, even if it is the metaphor user level, it is possible to make creation and the correction easily.

Although the concrete embodiment of the present invention showed only the ink-jet printing device and the thermal printing device, it drives the printing element based on the multi-level image data.

As other examples of the recording head of the printing device which forms the image on the recording medium Along with the photoconductor drum in the electrophotographic printer, the high-density light emitting diode array recording head is configured.

The recording head of the light emitting diode printer which this is made to be focused on the photoconductor drum using the convergent rod array lens.

The present invention can also be applied to the recording head of the liquid crystal printer performed by controlling electrically the transmission quantity of light of the liquid crystal of a large number which arranged optical beam irradiation to the photoconductor drum in the shape of an array etc., and all are the things of technical within the limits of the present invention.

According to the present invention, the following effects are done so that clearly from the above explanation. It has the recording head in which the plurality of printing elements like the ink-jet recording head and the thermal recording head are formed, and in the image-processing method of the printing device which drives the printing element based on the multi-level image data, and forms the image on the recording medium, even if variation is in the characteristics of the recording head, variation can be corrected only by choosing the gamma correction parameter according to characteristics, without changing the driving conditions of the recording head etc.

Moreover, even if it can correct variation and performs the image formation by which printing device, without changing the driving conditions of the recording head etc. by producing and carrying out the side color of the color patch, and choosing the gamma correction parameter by the recording head, even if variation is in the lightness and the optical density of the printed image, the same image quality is obtained.

Moreover, even if variation is in discharging characteristics in the case of the ink-jet recording head, while being able to correct variation easily, and not generating the satellite dot, the dust, etc. in the formed image but obtaining desirable image quality by choosing the gamma correction parameter according to discharging characteristics, without changing the driving conditions of the ink-jet recording head etc., even if it performs the image formation by which ink-jet printing device, the same image quality is obtained.

Furthermore, since in the case of the color ink-jet printing device the optimal gamma correction parameter is chosen for every ink-jet recording head of each color and the image formation is performed, even if it performs the image formation by which ink-jet printing device, the optical density of the formed image and the hue are not different and high image quality is obtained.

In addition, although this embodiment showed the example lightness is made to become ±ten or less, making not lightness but saturation of the black of the YMC colors below into the predetermined value also has the same effect from the point of obtaining the higher image quality from which the hue is not different to the black made from the YMC colors.

By the human eyes, the black which does not have dispersion in the hue is obtained by considering as ±ten or less saturation from the experiment of present-invention persons also as a predetermined value in this case.

The present invention is not limited to the above-described embodiments and variations and modifications may be made without departing from the scope of the invention. For example, the image forming apparatus to which the present invention is applied may be various kinds of image forming devices, such as printer, copier, and facsimile.

The invention claimed is:

1. An image-processing method for a printing device which has a recording head in which a plurality of printing elements are provided and drives the printing elements based on multi-level image data to form an image on a recording medium, comprising the steps of:
   selecting a gamma correction parameter according to printing characteristics of the recording head; and
   forming an image on the recording medium based on the selected gamma correction parameter.

2. A printing device which has a recording head in which a plurality of printing elements are provided and drives the printing elements based on multi-level image data to form an image on a recording medium, comprising:
   a selection unit selecting a gamma correction parameter according to printing characteristics of the recording head; and
   an image forming unit forming an image on the recording medium based on the gamma correction parameter selected by the selection unit.

3. An image-processing method for a printing device which has a recording head in which a plurality of printing elements are provided and drives the printing elements based on multi-level image data to form an image on a recording medium, comprising the steps of:
   selecting a gamma correction parameter according to lightness characteristics of a printed image of the recording head; and
   forming an image on the recording medium based on the selected gamma correction parameter.

4. A printing device which has a recording head in which a plurality of printing elements are provided and drives the printing elements based on multi-level image data to form an image on a recording medium, comprising:
   a selection unit selecting a gamma correction parameter according to lightness characteristics of a printed image of the recording head; and
   an image forming unit forming an image on the recording medium based on the gamma correction parameter selected by the selection unit.

5. The image-processing method according to claim 1 or 3 wherein the recording head in which the plurality of printing elements are provided is a thermal recording head, the gamma correction parameter is selected according to gradation printing characteristics of the thermal recording head, and the image is formed on the recording medium based on the selected gamma correction parameter.

6. The printing device, according to claim 2 or 4 wherein the recording head in which the plurality of the printing elements are provided is a thermal recording head, the selection unit selects the gamma correction parameter according to gradation printing characteristics of the thermal recording head, and the image forming unit forms the image on the recording medium based on the gamma correction parameter selected by the selection unit.

7. An image-processing method for a printing device which has a recording head in which a plurality of printing elements are provided and drives the printing elements based on multi-level image data to form an image on a recording medium, comprising the steps of:
   selecting a gamma correction parameter according to optical density characteristics of a printed image of the recording head; and
   forming an image on the recording medium based on the selected gamma correction parameter.

8. A printing device which has a recording head in which a plurality of printing elements are provided and drives the printing elements based on multi-level image data to form an image on a recording medium, comprising:
   a selection unit selecting a gamma correction parameter according to optical density characteristics of a printed image of the recording head; and
   an image forming unit forming an image on the recording medium based on the gamma correction parameter selected by the selection unit.

9. An image-processing method for an ink-jet printing device which has an ink-jet recording head in which a plurality of nozzles are provided and discharges ink drops from die plurality of nozzles based on multi-level image data to form an image on a recording medium, comprising the steps of:
   selecting a gamma correction parameter according to discharging characteristics of the ink-jet recording head; and
   forming an image on the recording medium based on the selected gamma correction parameter.

10. An ink-jet printing device which has an ink-jet recording head in which a plurality of nozzles are provided and discharges ink drops from the plurality of nozzles based on multi-level image data to form an image on a recording medium, comprising:
   a selection unit selecting a gamma correction parameter according to discharging characteristics of the ink-jet recording head; and
   an image forming unit forming an image on the recording medium based on the gamma correction parameter selected by the selection unit.

11. The ink-jet printing device according to claim 10 wherein the discharging characteristics of the ink-jet recording head are characteristics of an ink drop volume to an input gradation level.

12. The ink-jet printing device according to claim 10 wherein the discharging characteristics of the ink-jet recording head are characteristics of an ink drop velocity to an input gradation level.

13. An image-processing method for an ink-jet printing device which has an ink-jet recording head in which a plurality of nozzles are provided and discharges ink drops from the plurality of nozzles based on multi-level image data to form an image on a recording medium, comprising the steps of:
   selecting a gamma correction parameter according to lightness of a printed image of the ink-jet recording head; and
   forming an image on the recording medium based on the selected gamma correction parameter.

14. An ink-jet printing device which has an ink-jet recording head in which a plurality of nozzles are provided and discharges ink drops from the plurality of nozzles based on multi-level image data to form an image on a recording medium, comprising:
   a selection unit selecting a gamma correction parameter according to lightness of a printed image of the ink-jet recording head; and
   an image forming unit forming an image on the recording medium based on the gamma correction parameter selected by the selection unit.

15. The ink-jet printing device according to claim 14 wherein the gamma correction parameter is selected according to the lightness of the printed image to a plurality of gradation levels.

16. The ink-jet printing device according to claim 14 wherein the gamma correction parameter is selected according to the lightness of the printed image to one gradation level.

17. An image-processing method for an ink-jet printing device which has an ink-jet recording head in which a plurality of nozzles are provided and discharges ink drops from the plurality of nozzles based on multi-level image data to form an image on a recording medium, comprising the steps of:
   selecting a gamma correction parameter according to an optical density of a printed image of the ink-jet recording head; and
   forming an image on the recording medium based on the selected gamma correction parameter.

18. An ink-jet printing device which has an ink-jet recording head in which a plurality of nozzles are provided and discharges ink drops from the plurality of nozzles based on multi-level image data to form an image on a recording medium, comprising:
   a selection unit selecting a gamma correction parameter according to an optical density of a printed image of the ink-jet recording head; and
   an image forming unit an image on the recording medium based on the gamma correction parameter selected by the selection unit.

19. The ink-jet printing device according to claim 18 wherein the gamma correction parameter is selected according to the optical density of the printed image to a plurality of gradation levels.

20. The ink-jet printing device according to claim 18 wherein the gamma correction parameter is selected according to the optical density of the printed image to one gradation level.

21. An ink-jet printing device which has a plurality of ink-jet recording heads in which a plurality of nozzles are provided for each ink-jet recording head and discharges ink drops of a plurality of colors from the plurality of nozzles of the plurality of ink-jet recording heads respectively based on multi-level image data to form a color image on a recording medium, each ink-jet recording head comprising:
   a selection unit selecting a gamma correction parameter of a corresponding color according to discharging characteristics of the ink-jet recording head.

22. The ink-jet printing device according to any of claims 10, 18 and 21 wherein the selected gamma correction parameter is displayed.

23. The ink-jet printing device according to claim 21, wherein the selected gamma correction parameters of the plurality of colors are displayed respectively.

24. A printer driver of an ink-jet printing device which carries out the image-processing method according to any of claims 9, 13 and 17 wherein the image data is outputted to the ink-jet printing device according to the selected gamma correction parameter.

25. The prima driver according to claim 24 wherein the printer driver comprises a unit setting the selected gamma correction parameter to the ink-jet printing device.

26. The ink-jet printing device according to any of claims 10, 14, 18 and 21 wherein the ink-jet printing device comprises a unit storing a plurality of gamma correction parameters, and one of the plurality of the gamma correction parameters is selected.

27. The ink-jet printing device according to claim 21, wherein the ink-jet printing device comprises a unit storing a plurality of gamma correction parameters of the plurality of colors, and one of the plurality of the gamma correction parameters is selected.

28. The ink-jet printing device according to claim 21, wherein the gamma correction parameters are selected such that a difference in lightness between different printed images of the plurality of ink-jet recording heads for a same color is less than ±10.

29. The ink-jet printing device according to claim 21, wherein the ink-jet printing device comprises a unit storing the selected gamma correction parameters for the respective colors, and values of the selected gamma correction parameters for at least two colors are different.

30. The ink-jet printing device according to claim 29 wherein the ink-jet printing device comprises a unit setting a kind of the selected gamma correction parameter of each ink-jet recording head to the ink-jet printing device.

* * * * *